(12) United States Patent
Dighe

(10) Patent No.: US 9,440,163 B2
(45) Date of Patent: *Sep. 13, 2016

(54) SYSTEM AND METHOD FOR WATER TREATMENT

(75) Inventor: Shyam V. Dighe, North Huntingdon, PA (US)

(73) Assignee: Aquasource Technologies Corporation, North Huntingdon, PA (US)

(*) Notice: Subject to any disclaimer, the term of this patent is extended or adjusted under 35 U.S.C. 154(b) by 853 days.

This patent is subject to a terminal disclaimer.

(21) Appl. No.: 13/613,388

(22) Filed: Sep. 13, 2012

(65) Prior Publication Data

US 2013/0062189 A1 Mar. 14, 2013

Related U.S. Application Data

(60) Provisional application No. 61/573,900, filed on Sep. 14, 2011, provisional application No. 61/573,957, filed on Sep. 14, 2011, provisional application No. 61/573,958, filed on Sep. 14, 2011, provisional (Continued)

(51) Int. Cl.
*C02F 1/04* (2006.01)
*B01D 1/26* (2006.01)

(Continued)

(52) U.S. Cl.
CPC .............. *B01D 1/26* (2013.01); *B01D 1/0058* (2013.01); *B01D 1/16* (2013.01); *B01D 1/305* (2013.01);

(Continued)

(58) Field of Classification Search
CPC ............ C02F 1/04; C02F 1/048; C02F 1/06; C02F 2001/5218; B01D 1/26; B01D 3/06; B01D 3/065

See application file for complete search history.

(56) References Cited

U.S. PATENT DOCUMENTS 2,441,361 A 5/1948 Kirgan
3,119,752 A 1/1964 Checkovich (Continued)

FOREIGN PATENT DOCUMENTS

EP 1 770 068 4/2007
EP 1 775 265 4/2007

(Continued)

OTHER PUBLICATIONS

Notification of Transmittal of the International Search Report and the Written Opinion of the International Searching Authority, International Search Report and Written Opinion of the International Searching Authority for PCT/US2012/055175, dated Jan. 9, 2013 (12 pages).

(Continued)

*Primary Examiner* — In Suk Bullock
*Assistant Examiner* — Jonathan Miller
(74) *Attorney, Agent, or Firm* — Buchanan Ingersoll & Rooney PC

(57) ABSTRACT

System and method of treating waste water includes: receiving waste water at a first pressure and a first temperature, the waste water comprising dissolved solids and VOCs; pressurizing the waste water to a second pressure; preheating the pressurized waste water to a second temperature to produce distilled water and pressurized/preheated water; heating the pressurized/preheated to a third temperature to produce pressurized/heated water; removing dissolved solids from the pressurized/heated water, by an evaporator operated at a third pressure less than the second pressure, to produce steam and brine water; and crystallizing the brine water, by a crystallizer operated at a fourth pressure greater than the second pressure, to produce a solid mass waste product and steam. Steam produced by the crystallizer, at the fourth pressure and a fourth temperature, is a heat source for the preheater and/or heater, and steam produced by the evaporator is a heat source for the crystallizer.

44 Claims, 20 Drawing Sheets

Related U.S. Application Data application No. 61/573,956, filed on Sep. 14, 2011, provisional application No. 61/573,955, filed on Sep. 14, 2011, provisional application No. 61/573,954, filed on Sep. 14, 2011, provisional application No. 61/573,953, filed on Sep. 14, 2011, provisional application No. 61/573,952, filed on Sep. 14, 2011.

(51) Int. Cl.
| | |
|---|---|
| *B01D 1/00* | (2006.01) |
| *B01D 1/16* | (2006.01) |
| *B01D 1/30* | (2006.01) |
| *B01D 3/06* | (2006.01) |
| *B01D 5/00* | (2006.01) |
| *C02F 1/06* | (2006.01) |
| *C02F 1/16* | (2006.01) |
| *C02F 1/52* | (2006.01) |
| *C02F 103/10* | (2006.01) |

(52) U.S. Cl.
CPC ............... *B01D 3/06* (2013.01); *B01D 3/065* (2013.01); *B01D 5/0039* (2013.01); *C02F 1/048* (2013.01); *C02F 1/06* (2013.01); *C02F 1/16* (2013.01); *C02F 2001/5218* (2013.01); *C02F 2103/10* (2013.01); *C02F 2209/02* (2013.01); *C02F 2209/03* (2013.01); *C02F 2301/063* (2013.01)

(56) References Cited

U.S. PATENT DOCUMENTS

| | | |
|---|---|---|
| 3,186,924 A | 6/1965 | Williamson |
| 3,197,387 A | 7/1965 | Lawrance |
| 3,203,464 A | 8/1965 | Kingma |
| 3,213,000 A | 10/1965 | Ewing |
| 3,216,910 A | 11/1965 | Langer et al. |
| 3,285,832 A | 11/1966 | Sephton |
| 3,337,419 A | 8/1967 | Kogan |
| 3,342,697 A | 9/1967 | Hammond |
| 3,360,442 A | 12/1967 | Starmer |
| 3,396,086 A | 8/1968 | Starmer |
| 3,433,717 A | 3/1969 | Loebel |
| 3,434,522 A | 3/1969 | Laurenty |
| 3,442,765 A | 5/1969 | Levite |
| 3,487,873 A | 1/1970 | Bromley et al. |
| 3,488,260 A | 1/1970 | Gilbert |
| 3,488,686 A | 1/1970 | Dunwoody et al. |
| 3,586,090 A | 6/1971 | Henderson |
| 3,607,135 A | 9/1971 | Gereth et al. |
| 3,627,646 A | 12/1971 | Osdor |
| 3,634,199 A | 1/1972 | Winkle |
| 3,664,145 A | 5/1972 | Johnson |
| 3,690,116 A | 9/1972 | Cheng et al. |
| 3,734,160 A | 5/1973 | Osdor |
| 3,763,014 A | 10/1973 | Barba et al. |
| 3,844,899 A | 10/1974 | Sager, Jr. |
| 3,855,072 A | 12/1974 | Liu |
| 3,884,767 A | 5/1975 | Pottharst, Jr. |
| 3,912,578 A | 10/1975 | Didycz et al. |
| 3,926,739 A | 12/1975 | Izumi |
| 3,933,597 A | 1/1976 | Barba et al. |
| 3,946,495 A | 3/1976 | Osdor |
| 3,951,753 A | 4/1976 | Roller |
| 3,970,820 A | 7/1976 | Mahl |
| 4,010,018 A | 3/1977 | Kantor |
| 4,017,421 A | 4/1977 | Othmer |
| 4,035,243 A | 7/1977 | Katz et al. |
| 4,043,130 A | 8/1977 | Brown et al. |
| 4,055,145 A | 10/1977 | Mager et al. |
| 4,078,976 A | 3/1978 | Spears, Jr. |
| 4,083,781 A | 4/1978 | Conger |
| 4,105,505 A | 8/1978 | Saari |
| 4,136,530 A | 1/1979 | Kantor |
| 4,141,825 A | 2/1979 | Conger |
| 4,162,945 A | 7/1979 | Hofstede et al. |
| 4,186,058 A | 1/1980 | Katz et al. |
| 4,186,060 A | 1/1980 | Katz et al. |
| 4,282,067 A | 8/1981 | Katz et al. |
| 4,287,019 A | 9/1981 | Standiford |
| 4,312,710 A | 1/1982 | Tanaka et al. |
| 4,315,402 A | 2/1982 | Sadhukhan |
| 4,318,780 A | 3/1982 | Bailie |
| 4,319,964 A | 3/1982 | Katz et al. |
| 4,332,642 A | 6/1982 | Cane et al. |
| 4,334,961 A | 6/1982 | Moen et al. |
| 4,346,490 A | 8/1982 | Katz et al. |
| 4,367,639 A | 1/1983 | Kantor |
| 4,390,670 A | 6/1983 | Walinsky |
| 4,414,341 A | 11/1983 | Williams |
| 4,440,601 A | 4/1984 | Katz et al. |
| 4,441,337 A | 4/1984 | Kantor |
| 4,474,142 A | 10/1984 | Bharathan |
| 4,485,223 A | 11/1984 | Walinsky |
| 4,524,587 A | 6/1985 | Kantor |
| 4,547,559 A | 10/1985 | Walinsky |
| 4,591,413 A | 5/1986 | Peterson |
| 4,641,607 A | 2/1987 | Balazs et al. |
| 4,659,475 A | 4/1987 | Liao et al. |
| 4,710,537 A | 12/1987 | Walinsky |
| 4,731,164 A | 3/1988 | Williamsom |
| 4,750,983 A | 6/1988 | Foster et al. |
| 4,795,532 A | 1/1989 | Mizutani et al. |
| 4,941,330 A | 7/1990 | Williamson |
| 5,032,646 A | 7/1991 | Walinsky |
| 5,133,837 A | 7/1992 | Elmore et al. |
| 5,167,838 A | 12/1992 | Wilensky |
| 5,211,724 A * | 5/1993 | Khan et al. ................. 48/197 R |
| 5,232,603 A | 8/1993 | Denzinger et al. |
| 5,346,592 A * | 9/1994 | Madani ...................... 202/176 |
| 5,453,306 A | 9/1995 | Tatsumi et al. |
| 5,493,630 A | 2/1996 | Mariner et al. |
| 5,495,550 A | 2/1996 | Mariner et al. |
| 5,513,494 A | 5/1996 | Flynn et al. |
| 5,537,507 A | 7/1996 | Mariner et al. |
| 5,622,605 A | 4/1997 | Simpson et al. |
| 5,637,127 A | 6/1997 | McLaughlin et al. |
| 5,658,993 A | 8/1997 | Denzinger et al. |
| 5,671,322 A | 9/1997 | Finicle |
| 5,681,615 A | 10/1997 | Affinito et al. |
| 5,755,855 A | 5/1998 | Baker et al. |
| 5,861,049 A | 1/1999 | Lokhandwala |
| 5,887,117 A | 3/1999 | Desu et al. |
| 5,902,641 A | 5/1999 | Affinito et al. |
| 5,925,223 A | 7/1999 | Simpson et al. |
| 6,187,206 B1 | 2/2001 | Bernier et al. |
| 6,229,956 B1 | 5/2001 | Morris |
| 6,404,982 B1 | 6/2002 | Mariner et al. |
| 6,622,523 B2 | 9/2003 | Ludwig et al. |
| 6,919,000 B2 | 7/2005 | Klausner et al. |
| 7,081,205 B2 | 7/2006 | Gordon et al. |
| 7,189,436 B2 | 3/2007 | Kohler et al. |
| 7,225,620 B2 | 6/2007 | Klausner et al. |
| 7,328,591 B2 | 2/2008 | Holtzapple et al. |
| 7,416,666 B2 | 8/2008 | Gordon |
| 7,455,778 B2 | 11/2008 | Gordon |
| 7,476,323 B2 | 1/2009 | Gordon |
| 7,510,658 B2 | 3/2009 | Gordon |
| 7,678,227 B2 | 3/2010 | Alt |
| 7,708,865 B2 | 5/2010 | Holtzapple et al. |
| 7,828,883 B2 | 11/2010 | Aines et al. |
| 7,850,826 B2 | 12/2010 | Alt |
| 7,922,873 B2 | 4/2011 | St. Germain et al. |
| 7,950,250 B2 | 5/2011 | Holtzapple et al. |
| 7,954,322 B2 | 6/2011 | Henderson |
| 7,967,955 B2 * | 6/2011 | Heins ............... 203/12 |
| 8,097,128 B1 | 1/2012 | Sherry |
| 2004/0038808 A1* | 2/2004 | Hampden-Smith et al. ........ B01J 21/18 502/180 |
| 2009/0020481 A1 | 1/2009 | Bailie et al. |

(56) References Cited

U.S. PATENT DOCUMENTS

FOREIGN PATENT DOCUMENTS

| JP | 55059879 | 5/1980 |
| WO | 0250215 | 6/2002 |
| WO | 2006123258 | 11/2006 |
| WO | 2010133840 | 11/2010 |
| WO | 2012085860 | 6/2012 |
| WO | 2012127250 | 9/2012 |

OTHER PUBLICATIONS

Notification of Transmittal of the International Search Report and the Written Opinion of the International Searching Authority, International Search Report and Written Opinion of the International Searching Authority for PCT/US2012/055187, dated Dec. 17, 2012 (22 pages).

Notification of Transmittal of the International Search Report and the Written Opinion of the International Searching Authority, International Search Report and Written Opinion of the International Searching Authority for PCT/US2012/055191, dated Jan. 15, 2013 (14 pages).

Notification of Transmittal of the International Search Report and the Written Opinion of the International Searching Authority, International Search Report and Written Opinion of the International Searching Authority for PCT/US2012/055194, dated Jan. 22, 2013 (14 pages).

Supplementary European Search Report and Annex to the European Search Report on European Patent Application No. EP 12 83 2155, dated Jun. 25, 2015 (8 pages).

Supplementary European Search Report and Annex to the European Search Report on European Patent Application No. EP 12 83 2522, dated Jul. 20, 2015 (9 pages).

Supplementary European Search Report and Annex to the European Search Report on European Patent Application No. EP 12 83 1074, dated Jul. 14, 2015 (7 pages).

Supplementary European Search Report and Annex to the European Search Report on European Patent Application No. EP 12 83 1350, dated Jul. 14, 2015 (9 pages).

\* cited by examiner

SYSTEM AND METHOD FOR WATER TREATMENT

CROSS-REFERENCE TO RELATED APPLICATIONS

This patent application claims the benefit of U.S. Provisional Patent Application Nos. 61/573,900, 61/573,957, 61/573,958, 61/573,956, 61/573,955, 61/573,954, 61/573,953 and 61/573,952, all filed on Sep. 14, 2011, the disclosures of which are hereby incorporated by reference in their entireties.

FIELD OF THE INVENTION

The present invention is generally directed toward the treatment of water and, more particularly, toward the treatment of water containing large amounts of dissolved solids as may result, for example, from use of the water as a fracking fluid used in drilling gas wells. However, the embodiment proposed herein may be used in any situation where impurities to be removed from water exist.

BACKGROUND OF THE INVENTION

Ensuring a supply of potable water has been a frequent concern in many locations. Further concerns arise about the environmental impact of the disposal of contaminated water.

Conventional water treatment techniques for such purposes as, for example, municipal water treatment and/or obtaining potable water from sea water are known and are successful in many instances. However, some current activities show those techniques to have limited cost effectiveness.

For example, mining with water used to fracture rock or shale formations to recover natural gas (e.g., in the shale regions in the United States and western Canada including, but not limited to, Pennsylvania, Maryland, New York, Texas, Oklahoma, West Virginia and Ohio) requires a very large amount of water input and a significant amount of return (flowback) water that contains a great deal of contaminants and impurities. In order for this flowback water to be used in an environmentally responsible manner, it needs to be relatively free of contaminants/impurities. Water used, for example, in natural gas well drilling and production may contain organic materials, volatile and semi-volatile compounds, oils, metals, salts, etc. that have made economical treatment of the water to make it potable or reusable, or even readily and safely disposable, more difficult. It is desirable to remove or reduce the amount of such contaminants/impurities in the water to be re-used, and also to remove or reduce the amount of such contaminants/impurities in water that is disposed of.

The present invention is directed toward overcoming one or more of the above-identified problems.

SUMMARY OF THE INVENTION

The present invention can take numerous forms among which are those in which waste water containing a large amount of solids, including, for example, dissolved salts, is pressurized to allow considerable heat to be applied before the water evaporates, and is then subjected to separation and recovery apparatus to recover relatively clean water for reuse and to separate solids that include the afore-mentioned dissolved salts. In some instances, the concentrated solids may be disposed of as is, e.g., in a landfill. Where that is not acceptable (e.g., for reasons of leaching of contaminants), the concentrated solids may be supplied to a thermal, pyrolytic, reactor (referred to herein as a "crystallizer") for transforming them into a vitrified mass which can be placed anywhere glass is acceptable.

Particular apparatus for systems and processes in accordance with the present invention can be adapted from apparatus that may be presently currently available, but which has not been previously applied in the same manner. As an example, conventional forms of flash evaporation equipment, such as are used for treating sea water, in one or in multiple stages, may be applied herein as a salts concentration apparatus. Likewise, conventional forms of gasification/vitrification reactors, such as are used for municipal solid waste ("MSW") processing including, but not limited, to plasma gasification/vitrification reactors, may be applied for final separation of the contaminants from the water and for initial heating of the waste water.

The present disclosure presents examples of such systems and processes in which, in one or more successive concentration stages, steam output of a flash evaporator used to concentrate salts is raised in pressure by mechanical vapor compressors from a low level (e.g., 5 psia) to a substantially higher level (e.g., 150 psia), accompanied by elevation of the steam temperature. The steam is applied to heat incoming waste water for treatment and permits use of a smaller and less expensive heat exchanger than would be needed without such pressurization.

Additionally, in some examples, steam from one or more stages of salts concentration is pressurized (e.g., from 5 psia up to 150 psia) before applying the steam to a stripper to remove, for example, volatile organic compounds ("VOCs"), and making the water available for reuse in a prior or subsequent stage and the VOCs available for reaction in a pyrolytic (e.g., plasma) reactor or crystallizer.

In addition, examples can include use of a turbine to expand steam (e.g., having an input of steam exiting a reactor or crystallizer at 150 psia and an output of steam at 15 psia) which goes then to a VOC stripper for use as described above. A turbine, or the like, for steam pressure reduction generates power or mechanical energy that reduces overall energy consumption.

Such uses of compressors and turbines, while adding some additional initial costs, can save significant operating costs.

The present disclosure, among other things, also presents examples of such systems and processes in which, in one or more successive concentration stages, steam output from a flash evaporator used to concentrate salts is reduced in pressure from, for example, 150 psia input pressure to 25 psia output pressure, and the output steam is then sent to the stripper. The steam from the crystallizer (e.g., at 180 psia) is sent back to heat the pressurized waste water in each stage. A portion of the steam from the crystallizer is sent to the stripper after expanding in a turbine (e.g., a mechanical vapor turbine). A turbine is used to expand this steam before sending it to a stripper of volatile organic compounds ("VOCs").

The system and process of the present invention also includes, for example, applying saturated steam from the crystallizer to a condenser prior to flash evaporation of waste water and, therefore, a heater stage can be avoided. A preheater is used to heat incoming waste water (e.g., from 60° F. to 134° F.) by use of the condensate from the condenser.

The present disclosure, among other things, further presents examples of such systems and processes in which, in one or more successive concentration stages, steam output of a flash evaporator used to concentrate salts is reduced in pressure from, for example, 150 psia input to 5 psia downstream. The output steam is then repressurized to, e.g., 180 psia, prior to being applied to a crystallizer.

The system and process of the present invention further includes, for example, that saturated steam from the reactor/crystallizer is applied to a condenser prior to flash evaporation of waste water and, therefore, an extra heater stage can be avoided. A preheater, provided before the condenser, is used to heat incoming waste water (e.g., from 60° F. to 134° F.) by use of the condensate from the condenser.

The present disclosure, among other things, further presents examples of such systems and processes in which, in one or more successive concentration stages, waste water with dissolved solids (salts) is pressurized (e.g., from 15 psia to 400 psia) and heated (e.g., to 445° F.) before flash evaporation to a significantly lower flash pressure and temperature (e.g., 15 psia and 212° F.) and brine water with more concentrated salts.

Steam output from the concentration stages is, at least in part, supplied to a stripper to remove volatile organic compounds ("VOCs"). Additional steam from the concentration stages is pressurized (e.g., to 665 psia) prior to recycling back to the concentration stages as a heating fluid for incoming waste water.

Brine water from the concentration stages may be disposed of as is, with a significant amount of clean water recovered (e.g., as distilled water from heat exchangers of the concentration stages). Brine water may alternatively be treated in a thermal (e.g., plasma) reactor or crystallizer in order to separate the salts and recover water included in the brine water from the concentration stages.

Present examples described herein include operation of a crystallizer at a significantly higher pressure (e.g., 665 psia) than in many other thermal reactor systems in order to achieve a large temperature difference in heat exchangers of the concentration stages.

Examples described herein also include supplying saturated steam from the crystallizer directly to condensers of the concentration stages, from each of which it is then applied as a heating fluid of a preheater for the waste water. Such a system will not normally require any additional heating of the waste water prior to flash evaporation.

The present disclosure, among other things, presents examples of such systems and processes in which, in one or more concentration stages, waste water with dissolved solids (salts) is pressurized (e.g., to 400 psia) and heated (e.g., to 445° F.) before flash evaporation in a single flash evaporator to which multiple concentration stages supply waste water in parallel. For example, the waste water is split into three equal flows that are individually pressurized and heated prior to being subjected to flash evaporation together.

The flash evaporator produces steam that is then usable as a heating medium and brine water with more concentrated salts than the original waste water.

The resulting combined brine water from the concentration stages may be disposed of as is, with a significant amount of clean water recovered (e.g., as distilled water from heat exchangers of the concentration stages). Brine water may alternatively be treated in a pyrolytic (e.g., plasma) reactor or crystallizer in order to separate the salts and recover water included in the brine water from the concentration stages.

Where a crystallizer is used, it can provide superheated steam (developed from steam from the single, or plural, flash evaporator(s)) that is applied directly to condensers of the concentration stages, from each of which it is then applied as a heating fluid of a preheater for the waste water. Such a system will not normally require additional heating of the waste water prior to flash evaporation.

While the another embodiment of the present invention is described with respect to FIGS. 17-20 as including stages operating in parallel, it should be understand that any of the stages of the other embodiments may also be operated in parallel without departing from the spirit and scope of the present invention. Additionally, the embodiment of FIGS. 17-20 may also be operated in series.

A system for treating waste water is disclosed, the system including: a pump receiving waste water at a first pressure and a first temperature and pressurizing the received waste water to a second pressure greater than the first pressure, the waste water comprising dissolved solids, volatile organic compounds and other components generally and collectively called impurities; first and second preheaters receiving the pressurized waste water from the pump and preheating the pressurized waste water in successive stages to a second temperature greater than the first temperature to produce pressurized/preheated waste water, each of the first and second preheaters producing distilled water without boiling of the waste water across heat transfer surfaces; a condenser receiving the pressurized/preheated waste water and further heating the pressurized/preheated waste water to a third temperature greater than the second temperature to produce a pressurized/further heated waste water without boiling of the waste water across heat transfer surfaces; a heater receiving the pressurized/further heated waste water and still further heating the pressurized/further heated waste water to a fourth temperature greater than the third temperature to produce pressurized/heated waste water without boiling of the waste water across heat transfer surfaces; and an evaporator, operated at a third pressure less than the second pressure, removing dissolved solids from the pressurized/heated waste water by evaporation caused by depressurization of the waste water to produce steam and brine water, wherein the brine water has a total dissolved solids content greater than a total dissolved solids content of the received waste water, wherein steam from the evaporator is superheated to a fifth temperature greater than the fourth temperature and is used as a heat source by at least one of the heater, condenser and second preheater without boiling of the waste water across heat transfer surfaces.

The second pressure may be approximately 120-180 psia, and the third pressure may be approximately 4-6 psia.

The fourth temperature may be approximately 286-430° F., and the firth temperature may be approximately 400-600° F.

In one form, the pump, first and second preheaters, condenser, heater and evaporator comprise a stage, and wherein the system comprises multiple stages with the brine water output by one stage used as the received waste water of a next stage. The brine water output by each stage has a total dissolved solids content that is higher than that of a previous stage.

In another form, the system further includes a crystallizer crystallizing the brine water to produce a solid mass of waste product and steam, which may be a vitrified glass. The steam from the crystallizer may be mixed with steam from the evaporator and superheated to the fifth temperature, wherein the mixed and superheated steam may be used as a heat source by at least one of the heater, condenser and second preheater without boiling of the waste water across heat transfer surfaces.

In a further form, the crystallizer includes a plasma crystallizer and includes a plasma torch for vaporizing the water from the brine water and producing the solid mass of waste product and steam. The system further includes a stripper initially receiving the waste water and removing volatile organic compounds from the waste water prior to the waste water being pressurized by the pump, wherein the removed volatile organic compounds are used as a heat source by the plasma torch to crystallize the brine water. The steam produced by the evaporator, when cooled, produces distilled water. Additionally, the steam produced by the evaporator may be used as a heat source by the stripper without boiling of the waste water across heat transfer surfaces. The steam produced by the evaporator may also be used as a heat source by the first preheater without boiling of the waste water across heat transfer surfaces.

In yet a further form, the pump, first and second preheaters, condenser, heater and evaporator comprise a stage, and wherein the system comprises multiple stages operating in parallel with each receiving a portion of the waste water. The brine water output by each stage has a total dissolved solids content that is higher than that of the received waste water. The brine water from each stage is combined and supplied to the crystallizer which crystallizes the brine water to produce a solid mass of waste product and steam.

In still a further form, the pump, first and second preheaters, condenser, heater and evaporator comprise a stage, wherein the system comprises multiple stages with the brine water output by one stage used as the received waste water of a next stage, and wherein the received waste water at stages subsequent to a first stage is at a third pressure less than the first pressure.

A system for treating waste water is also disclosed, the system including: a pump receiving waste water at a first pressure and a first temperature and pressurizing the received waste water to a second pressure greater than the first pressure, the waste water comprising dissolved solids, volatile organic compounds and other components generally and collectively called impurities; a preheater receiving the pressurized waste water from the pump and preheating the pressurized waste water to a second temperature greater than the first temperature to produce pressurized/preheated waste water without boiling of the waste water across heat transfer surfaces; a condenser receiving the pressurized/preheated waste water and further heating the pressurized/preheated waste water to a third temperature greater than the second temperature to produce a pressurized/heated waste water without boiling of the waste water across heat transfer surfaces; an evaporator, operated at a third pressure less than the second pressure, removing dissolved solids from the pressurized/heated waste water by evaporation caused by depressurization of the waste water to produce steam and brine water, wherein the brine water has a total dissolved solids content greater than a total dissolved solids content of the received waste water; and a crystallizer, operated at a fourth pressure greater than the second pressure, receiving the brine water and crystallizing the brine water to produce a solid mass of waste product and steam, wherein steam from the crystallizer, at the fourth pressure and a fourth temperature greater than the third temperature, is used as a heat source by at least one of the condenser and preheater without boiling of the waste water across heat transfer surfaces, and wherein steam from the evaporator is used as a heat source by the crystallizer without boiling of the waste water across heat transfer surfaces.

In one form, the first pressure may be approximately 11.8-17.6 psia, and the first temperature may be approximately 480-72° F.

In one form, the second pressure may be approximately 120-180 psia, and the third temperature may be approximately 288-432° F.

In one form, the second pressure may be approximately 320-480 psia, and the third temperature may be approximately 356-534° F.

In one form, the third pressure may be approximately 20-30 psia, the fourth pressure may be approximately 144-216 psia, and the fourth temperature may be approximately 298-448° F.

In one form, the third pressure may be approximately 4-6 psia, the fourth pressure may be approximately 144-216 psia, and the fourth temperature may be approximately 298-448° F.

In one form, the third pressure may be approximately 12-18 psia, the fourth pressure may be approximately 532-798 psia, and the fourth temperature may be approximately 400-600° F.

In another form, the crystallizer includes a plasma crystallizer and includes a plasma torch for vaporizing the water from the brine water and producing the solid mass of waste product and steam. The system further includes a stripper initially receiving the waste water and removing volatile organic compounds from the waste water prior to the waste water being pressurized by the pump, wherein the removed volatile organic compounds are used as a heat source by the plasma torch to crystallize the brine water without boiling of the waste water across heat transfer surfaces.

In a further form, the system further included a mechanical vapor turbine receiving the steam from the crystallizer and reducing its pressure to the third pressure, wherein the reduced pressure steam is combined with the steam from the evaporator and used as a heat source by the stripper.

In yet a further form, the system further includes a mechanical vapor compressor receiving the steam from the evaporator and increasing its pressure to the fourth pressure, wherein the increased pressure steam is combined with the steam from the crystallizer and used as a heat source by at least one of the condenser and preheater without boiling of the waste water across heat transfer surfaces.

In still a further form, the pump, preheater, condenser and evaporator comprise a stage, and wherein the system comprises multiple stages with the brine water output by one stage used as the received waste water of a next stage, and wherein the brine water output by a last stage is input to the crystallizer. The brine water output by each stage has a total dissolved solids content that is higher than that of a previous stage.

In an additional form, the pump, preheater, condenser and evaporator comprise a stage, and wherein the system comprises multiple stages operating in parallel with each stage receiving a portion of the waste water, and wherein the brine water from each stage is combined and supplied to the crystallizer. The brine water output by each stage has a total dissolved solids content that is higher than that of the received waste water.

In yet and additional form, the pump, preheater, condenser and evaporator comprise a stage, wherein the system comprises multiple stages with the brine water output by one stage used as the received waste water of a next stage, and wherein the received waste water at stages subsequent to a first stage is at the third pressure.

A method of treating waste water is also disclosed, the method including the steps of: (a) receiving waste water at a first pressure and a first temperature, the waste water comprising dissolved solids, volatile organic compounds and other components generally and collectively called impurities; (b) pressurizing the received waste water to a second pressure greater than the first pressure; (c) preheating the pressurized waste water to a second temperature greater than the first temperature, wherein said preheating step is performed by first and second preheaters in successive stages to produce pressurized/preheated waste water, each of the first and second preheaters producing distilled water without boiling of the waste water across heat transfer surfaces; (d) heating the pressurized/preheated waste water to a third temperature greater than the second temperature to produce a pressurized/heated waste water without boiling of the waste water across heat transfer surfaces; (e) further heating the pressurized/heated waste water to a fourth temperature greater than the third temperature to produce pressurized/further heated waste water without boiling of the waste water across heat transfer surfaces; and (f) removing, by evaporation caused by depressurization of the waste water, dissolved solids from the pressurized/further heated waste water by an evaporator operated at a third pressure less than the second pressure to produce steam and brine water, wherein the brine water has a total dissolved solids content greater than a total dissolved solids content of the received waste water, wherein steam from the evaporator is superheated to a fifth temperature greater than the fourth temperature and is used as a heat source in at least one of steps (c)—by the second preheater, (d) and (e) without boiling of the waste water across heat transfer surfaces.

The second pressure may be approximately 120-180 psia, and the third pressure may be approximately 4-6 psia.

The fourth temperature may be approximately 286-430° F., and the firth temperature may be approximately 400-600° F.

In one form, steps (a)-(f) comprise a stage, and wherein the method is performed in multiple stages with the brine water output by step (f) in one stage used as the received waste water in step (a) of a next stage. The brine water output in step (f) of each stage has a total dissolved solids content that is higher than that of a previous stage.

In another form, the method further includes the steps of: (g) crystallizing the brine water to produce a solid mass of waste product and steam. The steam produced by step (g) is mixed with steam produced by step (f) and superheated to the fifth temperature, wherein the mixed and superheated steam may be used as a heat source in at least one of steps (c)—by the second preheater, (d) and (e) without boiling of the waste water across heat transfer surfaces. A plasma crystallizer using a plasma torch may be used to crystallize the brine water. The solid mass may include a vitrified glass of the salts in the brine water.

In a further form, the method further includes the steps of: (b') prior to step (b), removing the volatile organic compounds from the received waste water, wherein the removed volatile organic compounds are used as a heat source by the plasma torch to crystallize the brine water. The steam produced by step (f) may be used as a heat source in step (b'). The steam produced by step (f) may be used as a heat source in step (c)—by the first preheater.

In yet a further form, steps (a)-(f) comprise a stage, and wherein the method is performed in multiple stages operating in parallel with each stage receiving a portion of the waste water. The brine water output in step (f) of each stage has a total dissolved solids content that is higher than that of the received waste water. The brine water output in step (f) of each stage is combined and supplied to a crystallizer which crystallizes the combined brine water to produce a solid mass of waste product and steam.

In still a further form, steps (a)-(f) comprise a stage, and wherein the method is performed in multiple stages with the brine water output by step (f) in one stage used as the received waste water in step (a) of a next stage, and wherein the received waste water at step (a) in stages subsequent to a first stage is at a third pressure less than the first pressure.

A method of treating waste water is also disclosed, the method including the steps of: (a) receiving waste water at a first pressure and a first temperature, the waste water comprising dissolved solids, volatile organic compounds and other components generally and collectively called impurities; (b) pressurizing the received waste water to a second pressure greater than the first pressure; (c) preheating the pressurized waste water to a second temperature greater than the first temperature to produce distilled water and pressurized/preheated waste water without boiling of the waste water across heat transfer surfaces; (d) heating the pressurized/preheated to a third temperature greater than the second temperature to produce pressurized/heated waste water without boiling of the waste water across heat transfer surfaces; (e) removing, by evaporation caused by depressurization of the waste water, dissolved solids from the pressurized/heated water, by an evaporator operated at a third pressure less than the second pressure, to produce steam and brine water, wherein the brine water has a total dissolved solids content greater than a total dissolved solids content of the received waste water; and (f) crystallizing the brine water, by a crystallizer operated at a fourth pressure greater than the second pressure, to produce a solid mass of waste product and steam, wherein steam produced by step (f), at the fourth pressure and a fourth temperature greater than the third temperature, is used as a heat source in at least one of steps (c) and (d), and wherein steam produced by step (e) is used as a heat source in step (g).

In one form, the first pressure may be approximately 11.8-17.6 psia, and the first temperature may be approximately 480-72° F.

In one form, the second pressure may be approximately 120-180 psia, and the third temperature may be approximately 288-432° F.

In one form, the second pressure may be approximately 320-480 psia, and the third temperature may be approximately 356-534° F.

In one form, the third pressure may be approximately 20-30 psia, the fourth pressure may be approximately 144-216 psia, and the fourth temperature may be approximately 298-448° F.

In one form, the third pressure may be approximately 4-6 psia, the fourth pressure may be approximately 144-216 psia, and the fourth temperature may be approximately 298-448° F.

In one form, the third pressure may be approximately 12-18 psia, the fourth pressure may be approximately 532-798 psia, and the fourth temperature may be approximately 400-600° F.

In another form, step (f) uses a plasma torch to crystallize the brine water, and wherein the method further includes the steps of: (b') prior to step (b), removing the volatile organic compounds from the received waste water, wherein the removed volatile organic compounds are used as a heat source by the plasma torch to crystallize the brine water.

In a further form, the steam produced by step (f) is reduced in pressure to the third pressure, and wherein the reduced pressure steam is combined with steam produced in step (e) and used as a heat source in step (b').

In yet a further form, the steam produced in step (e) in increased in pressure to the fourth pressure, and wherein the increased pressure steam is combined with steam produced in step (f) and used as a heat source in at least one of steps (c) and (d).

In still a further form, steps (a)-(e) comprise a stage, and wherein the method is performed in multiple stages with the brine water output by step (e) in one stage used as the received waste water in step (a) of a next stage, and wherein the brine water output by step (e) in a last stage is input to the crystallizer at step (f). The brine water output by step (e) of each stage has a total dissolved solids content that is higher than that of a previous stage.

In yet another form, steps (a)-(e) comprise a stage, and wherein the method is performed in multiple stages operating in parallel with each stage receiving a portion of the waste water, and wherein the brine water output by step (e) in each stage is combined and supplied to the crystallizer at step (f). The brine water output by step (e) of each stage has a total dissolved solids content that is higher than that of the waste water received at that particular stage.

In still another form, steps (a)-(e) comprise a stage, and wherein the method is performed in multiple stages operating in parallel with each stage receiving a portion of the waste water, wherein the brine water output by step (e) in each stage is combined and supplied to the crystallizer at step (f), and wherein the received waste water at stages subsequent to a first stage is at the third pressure.

Further explanations and examples of various aspects of the present invention are presented in the following disclosure.

It is an object of the present invention to provide a system and method for the economic and environmental treatment of waste water.

Various other objects, aspects and advantages of the present invention can be obtained from a study of the specification, the drawings, and the appended claims.

BRIEF DESCRIPTION OF THE DRAWINGS

Further possible embodiments are shown in the drawings. The present invention is explained in the following in greater detail as an example, with reference to exemplary embodiments depicted in drawings. In the drawings.

DETAILED DESCRIPTION OF THE INVENTION

Figure 1:
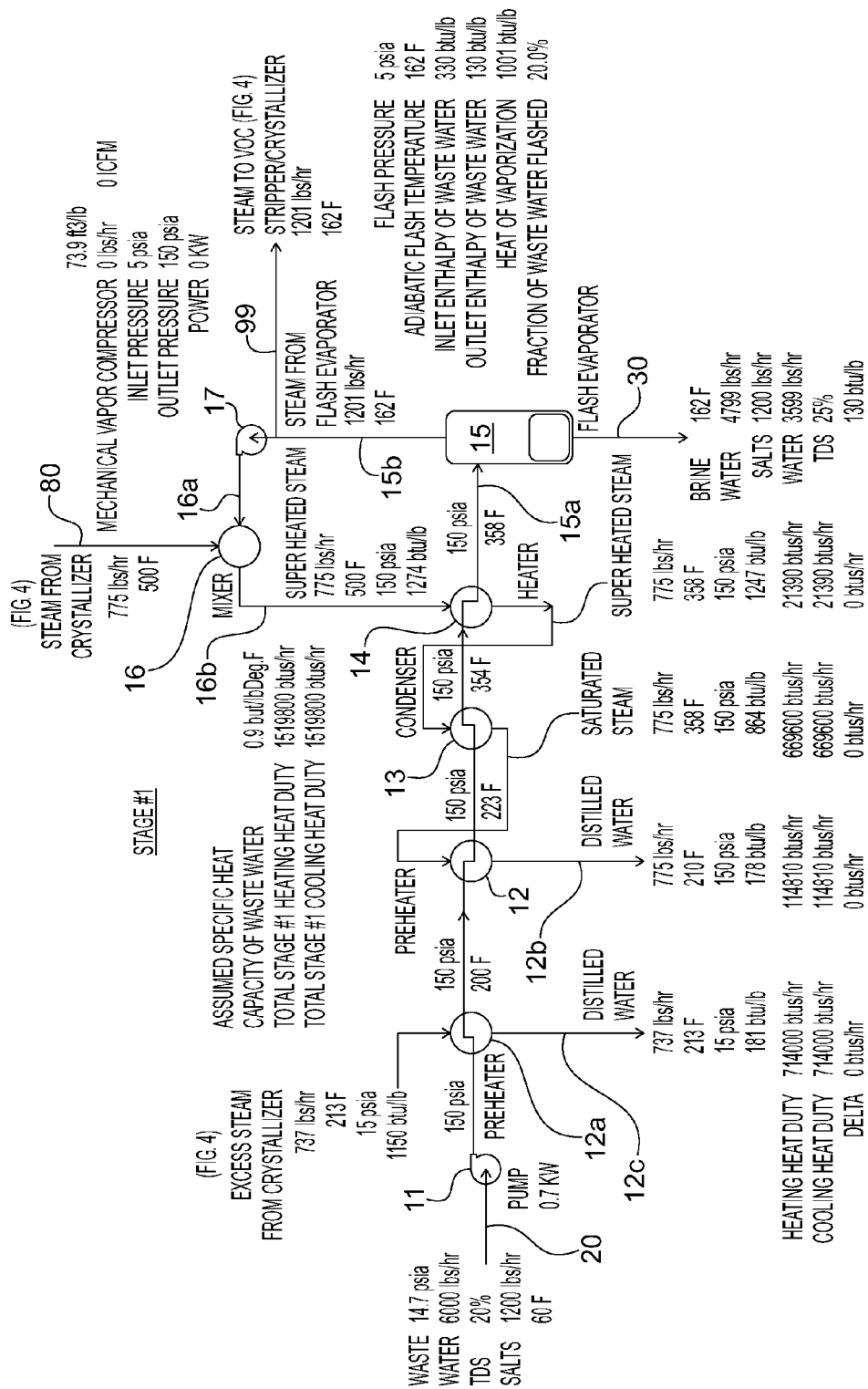
FIGS. 1, 2 and 3 are schematic flow diagrams of particular examples of stages of a treatment system in accordance with the present invention.
Figure 2:
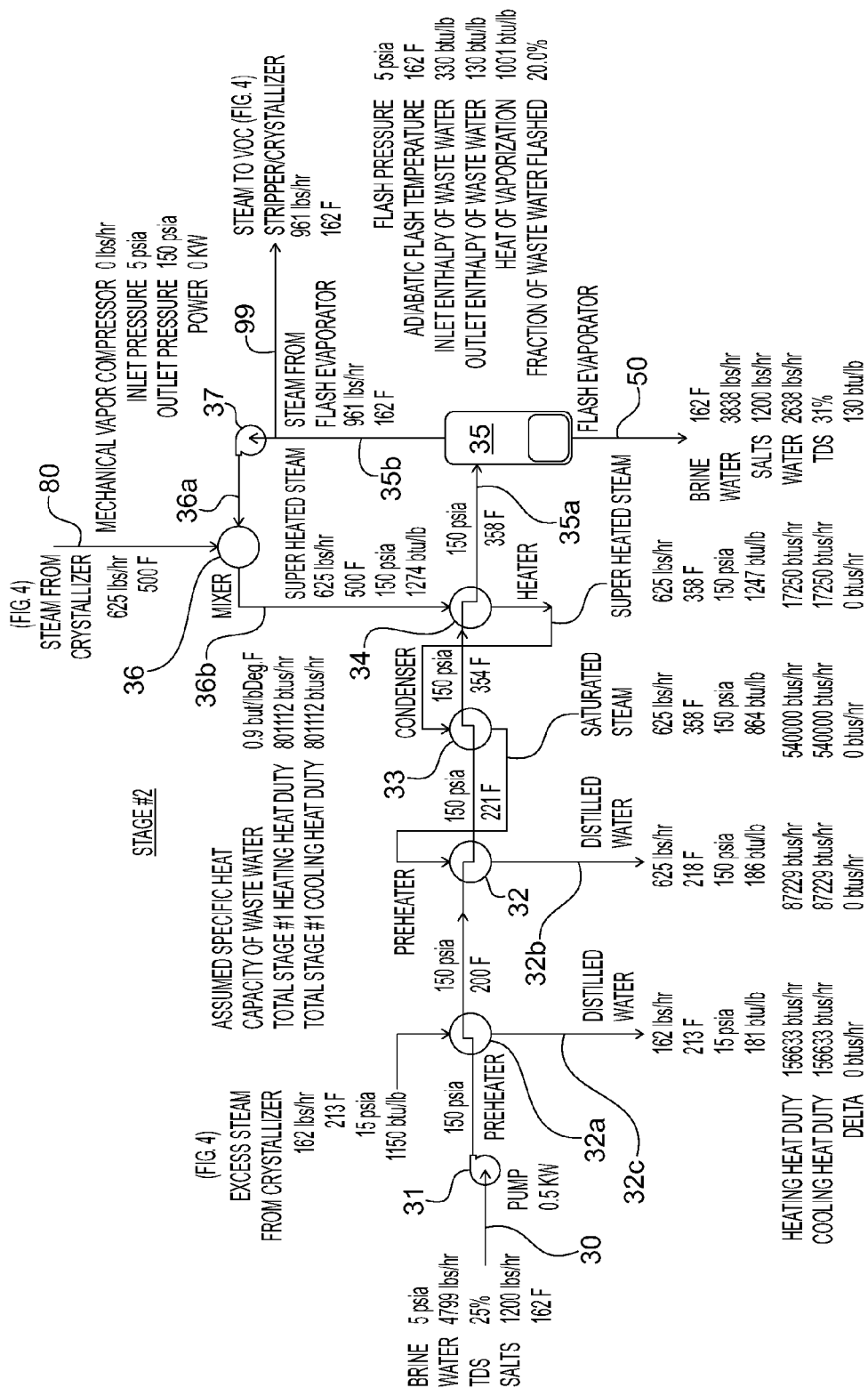
Figure 3:
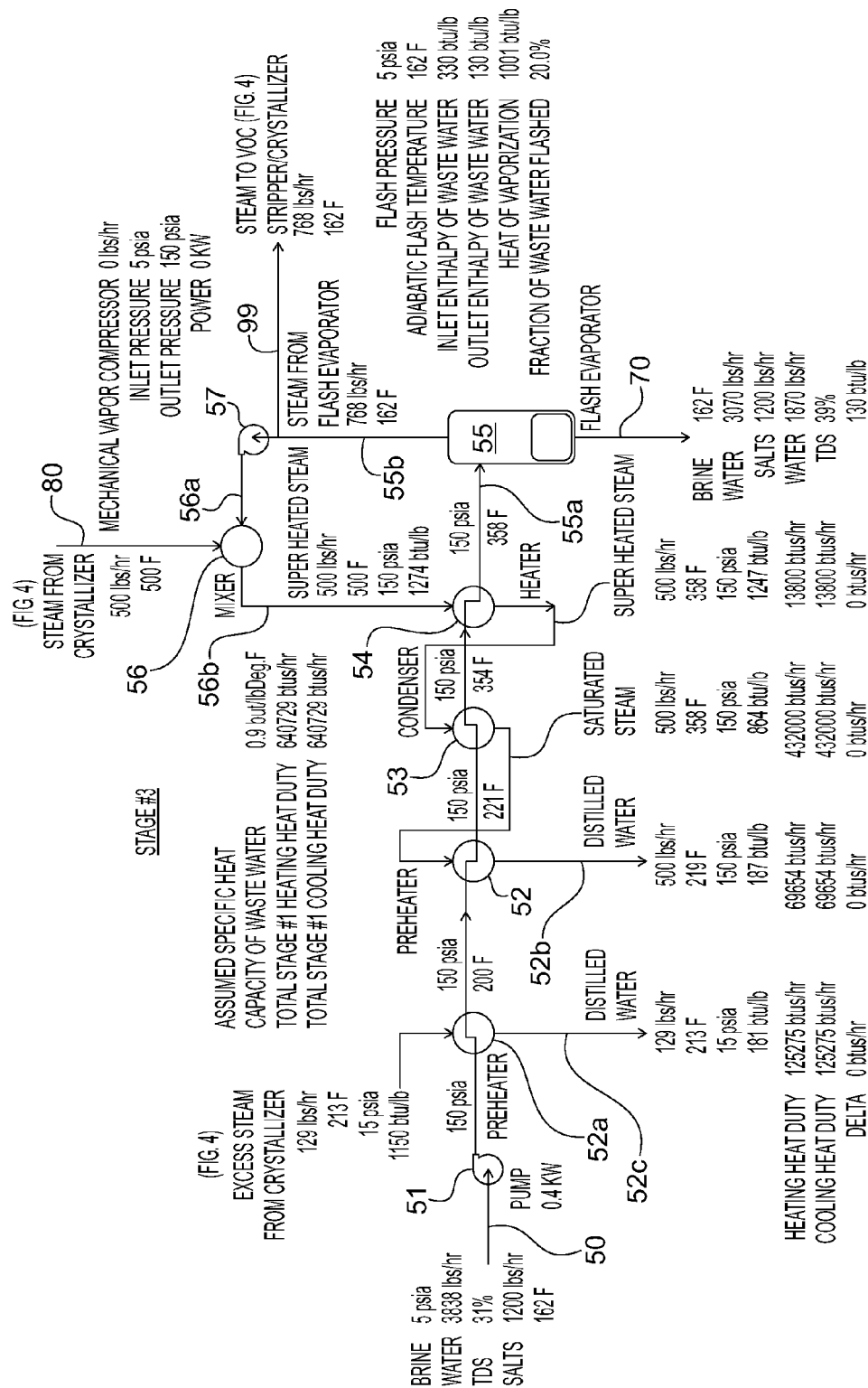

FIGS. 1, 2 and 3 will be individually discussed, but first their general relation to each other in an exemplary multi-stage system will be described. FIG. 1 shows Stage #1. This first stage takes in waste water at an inlet 20, processes it and produces first stage brine water at an outlet 30 of the first stage. The first stage brine water from the outlet 30 is input to the second stage shown in FIG. 2 (Stage #2) for additional processing, and a resulting second stage brine water is produced as an output at outlet 50. Similarly, the brine water from outlet 50 of the second stage is supplied as an input to the third stage shown in FIG. 3 (Stage #3) that has additional processing, resulting in a third stage output of brine water at an outlet 70.

It will be seen and appreciated by one skilled in the art how the successive stages of FIGS. 1, 2 and 3 increase the concentration of salts in the brine water (e.g., Total Dissolved Solids—"TDS"). It will also be appreciated how the number of stages is a variable that can be chosen according to various factors including, but not limited to, the salts content of the original waste water and the desired salt content after concentration. In general, a system in accordance with these exemplary embodiments may include any one or more stages such as are shown, for example, in FIGS. 1-3. The examples presented herein are merely illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 1-4, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 1, which shows Stage #1, the waste water progresses from the input 20 to the output 30 successively through a pump 11, preheaters 12a and 12, a condenser 13, an additional heater 14, and a flash evaporator 15. In the preheater 12a, the heating medium is the excess steam available from a crystallizer 90 (see FIG. 4), while for the preheater 12, the heating medium is the hot water available from the condenser 13.

The pump 11 elevates the waste water pressure from approximately 14.7 psia (1 atm) to approximately 150 psia. The level of pressurization of waste water in all stages is such that there is no boiling of the waste water inside and across the heat exchanger surfaces of all heat exchangers used in this system. This is done to prevent formation of deposits (scales, fouling etc.) on the heat exchanger surfaces. The temperature is also raised by the successive preheaters 12a and 12, the condenser 13 and the heater 14, so the input waste water to the flash evaporator 15 at inlet 15a is at 150 psia and 358° F.

Figure 4:
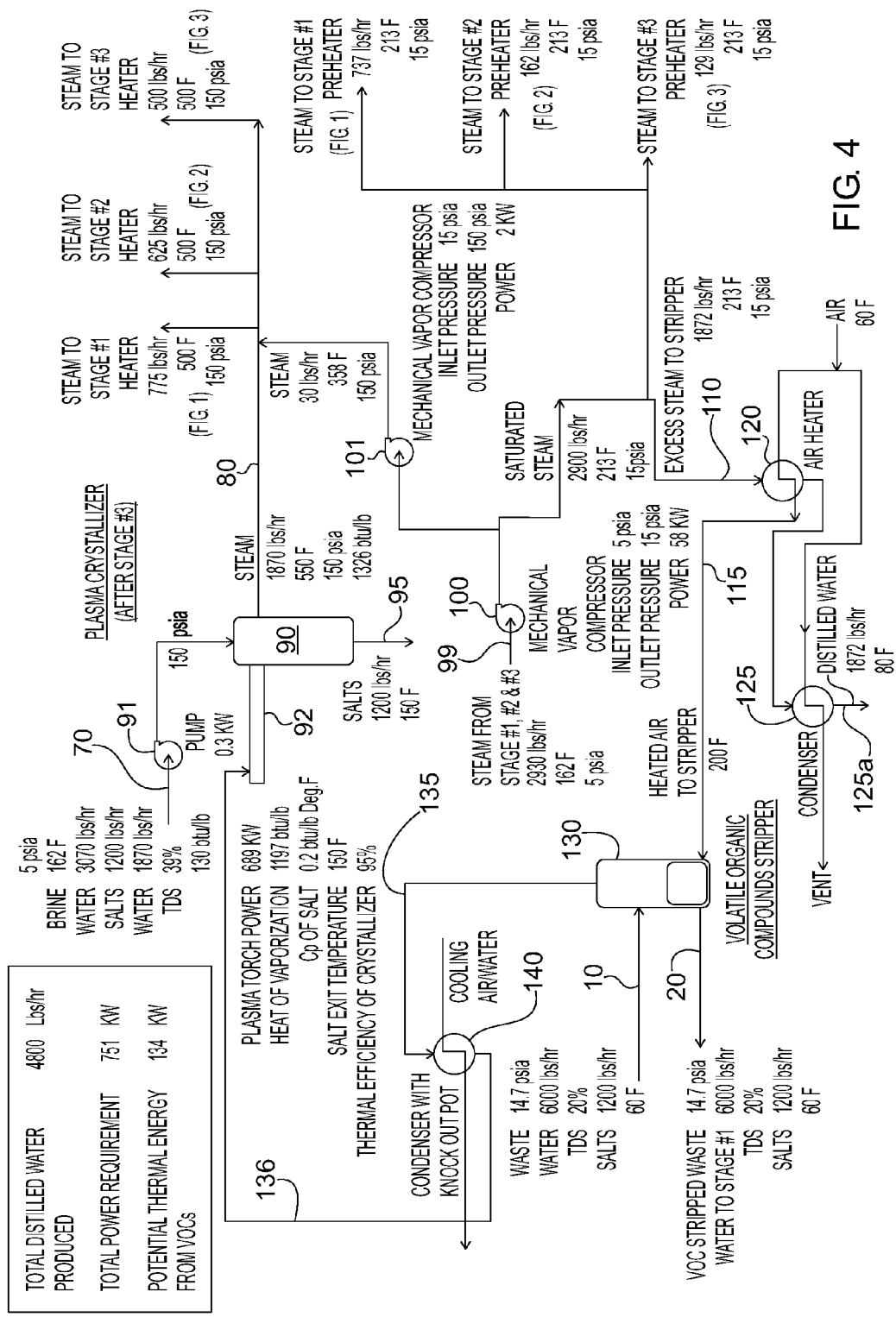
FIG. 4 is a schematic flow diagram of an exemplary thermal reactor for use in a water treatment system in conjunction with elements such as those shown in FIGS. 1-3 in accordance with the present invention.

The elevation in temperature is the effect of steam from one steam output 80 of the crystallizer subsystem 90 of FIG. 4. That steam is mixed in a mixer 16 of FIG. 1 with part of the steam from the flash evaporator 15 at line 15b that goes through a compressor 17 before it reaches the mixer 16 at input 16a. Some of the steam from the evaporator 15 at line 15b is also fed to the stripper 130 (see FIG. 4). The output 16b of the mixer 16 is a superheated steam at approximately 500° F. and 150 psia which, following its use as a heating fluid in the heater 14, continues to the condenser 13 and the preheater 12 until it exits the preheater 12 at outlet 12b as distilled water. Additionally, as shown in FIG. 1, the output of preheater 12a at outlet 12c is also distilled water. Under certain operating conditions, the steam addition from the crystallizer 90 may be negative, i.e., steam is sent as excess to the crystallizer 90 for other uses (e.g., as a heat source for the stripper 130).

The Stage #1 output 30 has the volume of waste water reduced from the input 10 with the salts more concentrated to 25% TDS, which is increased from the initial approximately 20% TDS in the exemplary waste water at the input 20.

Stage #2 of the system as shown in FIG. 2 has elements substantially like those of Stage #1 in FIG. 1, but with some different operating parameters as shown in the legends in FIG. 2. Referring to FIG. 2, which shows Stage #2, the waste water progresses from the input 30 to the output 50 successively through a pump 31, preheaters 32a and 32, a condenser 33, an additional heater 34, and a flash evaporator 35. In the preheater 32a, the heating medium is the excess steam available from a crystallizer 90 (see FIG. 4), while for the preheater 32, the heating medium is the hot water available from the condenser 33.

The pump 31 elevates the waste water pressure from approximately 5 psia at its input to approximately 150 psia. The temperature is also raised by the successive preheaters 32a and 32, the condenser 33 and the heater 34, so the input waste water to the flash evaporator 35 at inlet 35a is at 150 psia and 358° F.

The elevation in temperature is the effect of steam from one steam output 80 of the crystallizer subsystem 90 of FIG. 4. That steam is mixed in a mixer 36 of FIG. 2 with part of the steam from the flash evaporator 35 at line 35b that goes through a compressor 37 before it reaches the mixer 36 at input 36a. Some of the steam from the evaporator 35 at line 35b is also fed to the stripper 130 (see FIG. 4). The output 36b of the mixer 36 is a superheated steam at approximately 500° F. and 150 psia which, following its use as a heating fluid in the heater 34, continues to the condenser 33 and the preheater 32 until it exits the preheater 32 at outlet 32b as distilled water. Additionally, as shown in FIG. 2, the output of preheater 32a at outlet 32c is also distilled water. Under certain operating conditions, the steam addition from the crystallizer 90 may be negative, i.e., steam is sent as excess to the crystallizer 90 for other uses (e.g., as a heat source for the stripper 130).

The Stage #2 output 50 has the volume of waste water reduced from the input 30 with the salts more concentrated to 31% TDS, which is increased from the initial approximately 25% TDS in the exemplary brine water at the input 30.

Similarly, Stage #3 of FIG. 3 has elements substantially like those of FIG. 2, but with still some differences in operating parameters as shown in the legends in FIG. 3. Referring to FIG. 3, which shows Stage #3, the waste water progresses from the input 50 to the output 70 successively through a pump 51, preheaters 52a and 52, a condenser 53, an additional heater 54, and a flash evaporator 55. In the preheater 52a, the heating medium is the excess steam available from a crystallizer 90 (see FIG. 4), while for the preheater 52, the heating medium is the hot water available from the condenser 53.

The pump 51 elevates the waste water pressure from approximately 5 psia at its input to approximately 150 psia. The temperature is also raised by the successive preheaters 52a and 52, the condenser 53 and the heater 54, so the input waste water to the flash evaporator 55 at inlet 55a is at 150 psia and 358° F.

The elevation in temperature is the effect of steam from one steam output 80 of the crystallizer subsystem 90 of FIG. 4. That steam is mixed in a mixer 56 of FIG. 3 with part of the steam from the flash evaporator 55 at line 55b that goes through a compressor 57 before it reaches the mixer 56 at input 56a. Some of the steam from the evaporator 55 at line 55b is also fed to the stripper 130 (see FIG. 4). The output 56b of the mixer 56 is a superheated steam at approximately 500° F. and 150 psia which, following its use as a heating fluid in the heater 54, continues to the condenser 53 and the preheater 52 until it exits the preheater 52 at outlet 52b as distilled water. Additionally, as shown in FIG. 2, the output of preheater 52a at outlet 52c is also distilled water. Under certain operating conditions, the steam addition from the crystallizer 90 may be negative, i.e., steam is sent as excess to the crystallizer 90 for other uses (e.g., as a heat source for the stripper 130).

The Stage #3 output 70 has the volume of waste water reduced from the input 50 with the salts more concentrated to 39% TDS, which is increased from the initial approximately 31% TDS in the exemplary brine water at the input 50.

The exemplary system includes multiple (three) concentration stages (FIGS. 1-3) that are substantially alike in the combination of equipment used. However, other exemplary systems with multiple concentration stages may have individual stages of more viewed combinations of equipment without departing from the spirit and scope of the present invention.

The level of pressurization of waste water in all stages is such that there is no boiling (nucleate or other type) of the waste water inside and across the heat exchanger surfaces of the condensers, heaters and preheaters of each stage. This prevents the formation of deposits (scales, fouling etc.) on the heat exchanger surfaces and reduces the requirement for cleaning of the heat exchangers. This results in the reduction of the operating cost.

FIG. 4 represents an exemplary embodiment of applying the output brine water (line 70) of the Stage #3 treatment (FIG. 3) to a plasma crystallizer 90. The plasma crystallizer 90 is an example of a known pyrolytic reactor that can be used to finish separation of water from salts dissolved therein. One skilled in the art will appreciate, however, that other thermal reactors may also be used without departing from the spirit and scope of the present invention. The example of a plasma reactor, which can be consistent with known plasma gasification/vitrification reactors, operated with one or more plasma torches 92, as is well-known in published literature, is believed to provide opportunity for a favorable cost-benefit ratio.

In general, for multistage operation, the plasma crystallizer 90 (or other reactor) is utilized after the final concentration stage when the output brine water has been concentrated to a desired level, as described in the above example. It can also be suitable to have a multistage system not only for salts concentration (as in FIGS. 1-3), but also a separation subsystem with a reactor (e.g., plasma crystallizer 90) after any individual one of the early concentration stages (e.g., after either, or both, of Stages #1 and #2). However, it is generally more cost effective to have a single separation subsystem after the last of a determined number of concentration stages for the desired separation.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 4, the crystallizer 90 has a salts output at an outlet 95 that is generally equivalent to the total salts content of the original waste water. The water output of the total system is recovered as clean distilled water from the preheaters 12a, 12, 32a, 32, 52a, 52 of the respective stages of FIGS. 1-3, and/or may be recovered directly from excess steam exiting the crystallizer system 90 at line 80 and/or the excess steam exiting the respective flash evaporators 15, 35, 55 at line 99 (the excess steam is condensed to form distilled water). The pressure of the steam in line 99 is first increased by a compressor 100 from approximately 5 psia to 15 psia at line 110. This excess steam 110 is then utilized to heat air in the heater 120 and then condensed in condenser 125 to produce distilled water at line 125a. The condenser 125 can be cooled by air or by plant cooling tower water.

FIG. 4 shows the brine water 70 entering the crystallizer 90 via a pump 91 that raises the pressure to 150 psia. FIG. 4 also shows how steam from the crystallizer 90 can be redirected back to the respective earlier Stages of FIGS. 1-3. The steam output from the crystallizer 90 at line 80 may be provided back to the various Stages #1, #2 and #3 and used for heating by the respective heaters and condensers therein. Heated air at line 115 from the heater 120 is used in the stripper 130 which is utilized to remove, for example, volatile organic compounds ("VOCs") from the waste water. Some excess steam may also be used for other purposes, e.g., to preheat the waste water in a preheater or a condenser.

Before treatment in the Stages shown in FIGS. 1-3, the incoming waste water 10 can be, for example, sent to the stripper 130 where steam 115 is used to remove VOCs from the waste water 10. FIG. 4 shows steam from the concentration Stages #1, #2 and #3 at an input 99 of the compressor 100 that is elevated to a temperature of 213° F. for use in the stripper 130. The excess steam can be used directly in the stripper 130, as shown in FIG. 4, or used to heat air in a separate heat exchanger where the heated air is then used in the stripper to remove the VOCs. Additionally, the steam from the compressor 100 can be applied to another compressor 101 to increase its temperature and pressure to that of the steam in line 80, and then combined with the steam in line 80.

The stripped wastewater is sent as feed to the input 20 to Stage #1 of FIG. 1. The VOCs which are removed from the waste water 10 exit the stripper 130 through a conduit 135 which is sent to a condenser 140, in which the VOCs are condensed to form liquid by using, for example, cooling water or air. The VOCs exit the condenser 140 at outlet 136 which connects to the plasma crystallizer 90. The VOCs are fed in front of the plasma torch 92 (e.g., along with brine water 70 from the pump 91) such that they intensely mix with the high temperature gases exiting from the plasma torch 92. The plasma torch 92 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 90, along with heat inputted through the plasma torch 92, to vaporize the water from the brine water 70. This reduces the amount of heat and the corresponding amount of electricity utilized in the plasma crystallizer 90, thus increasing its cost effectiveness.

The steam exiting the plasma crystallizer 90 can be periodically vented to the atmosphere (not shown) to keep the levels of non-condensable gases low enough such that they do not degrade the performance of the heat exchangers used in the inventive system and process.

It is therefore seen that systems and processes in accordance with the present invention can make use of known and available components (such as, for example, flash evaporators for concentration of salts and plasma (or other) gasifier reactors for crystallization (or vitrification) of the salts) in particular innovative ways with insight as to both the capital cost and the operating cost. A need for such cost effective water treatment has been heightened by practices such as, for example, the use of large amounts of water in natural gas drilling. However, the present invention may be used in any situation where impurities to be removed exist.

In general summary, but without limitation, an embodiment of the present invention can be characterized in the following ways, for example: A system, and a corresponding method, in which waste water is supplied to one or more stages of equipment including a pump for pressurizing the water (e.g., to at least about 10 times atmospheric pressure), a heater that heats the pressurized waste water well above normal boiling temperature, a flash evaporator, or other device, that receives the heated, pressurized water and results in fluid evaporation and concentration of solids that were in the waste water. In for example, instances in which the waste (brine) water with concentrated solids cannot be otherwise readily and safely disposed of, a thermal or pyrolytic reactor is provided to crystallize or otherwise yield a form of the solids that can be readily and safely disposed of. In one form, such a reactor may also be applied as a heater for the original incoming waste water. Also, or alternatively, such a reactor may be used to form a vitrified glass of the salts output of any water treatment system that produces a brine water.

Furthermore, the examples of FIGS. 1-4 show how use can be made of flash evaporators operated at a low downstream pressure (e.g., 5 psia or only about one-third of 1 atm) along with compressors, as well as with a mixer for steam from a flash evaporator (after compression in a compressor) added with steam returned from a reactor. All of which is believed to contribute significantly to reduced operating costs which can be very beneficial, even though initial capital costs may be increased.

Figure 5:
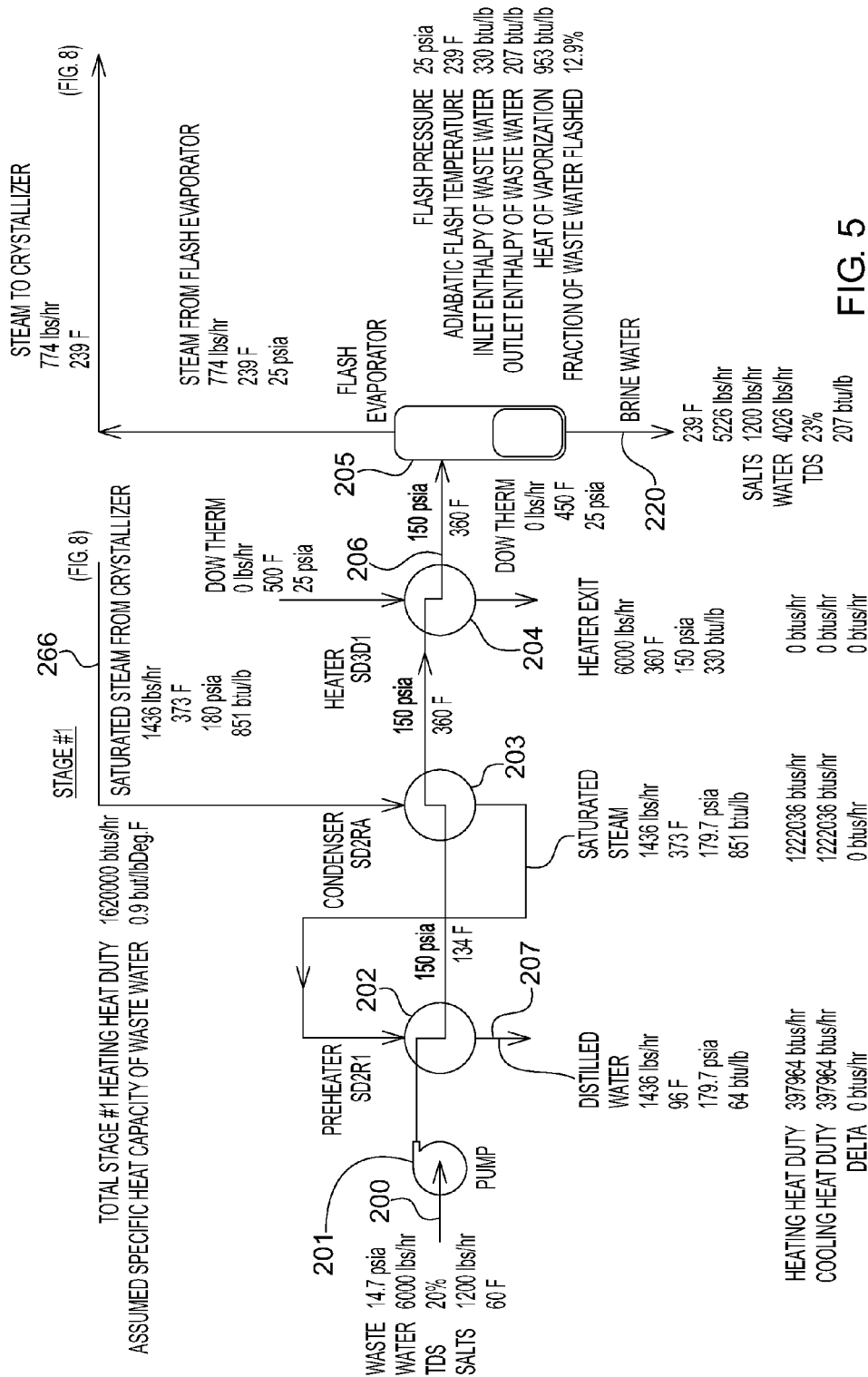
FIGS. 5, 6 and 7 are schematic flow diagrams of stages of a treatment system in accordance with a further embodiment of the present invention.
Figure 6:
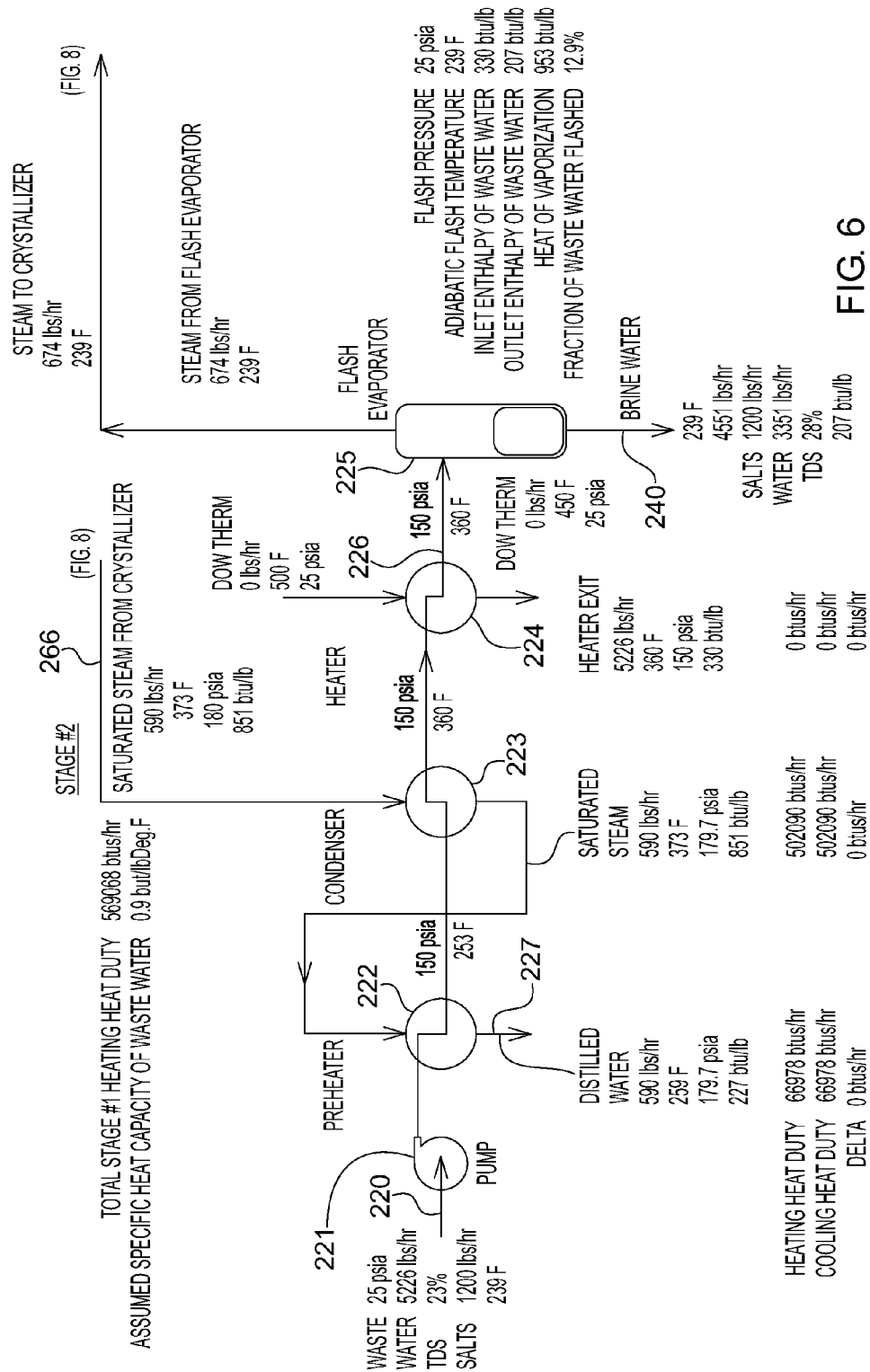
Figure 7:
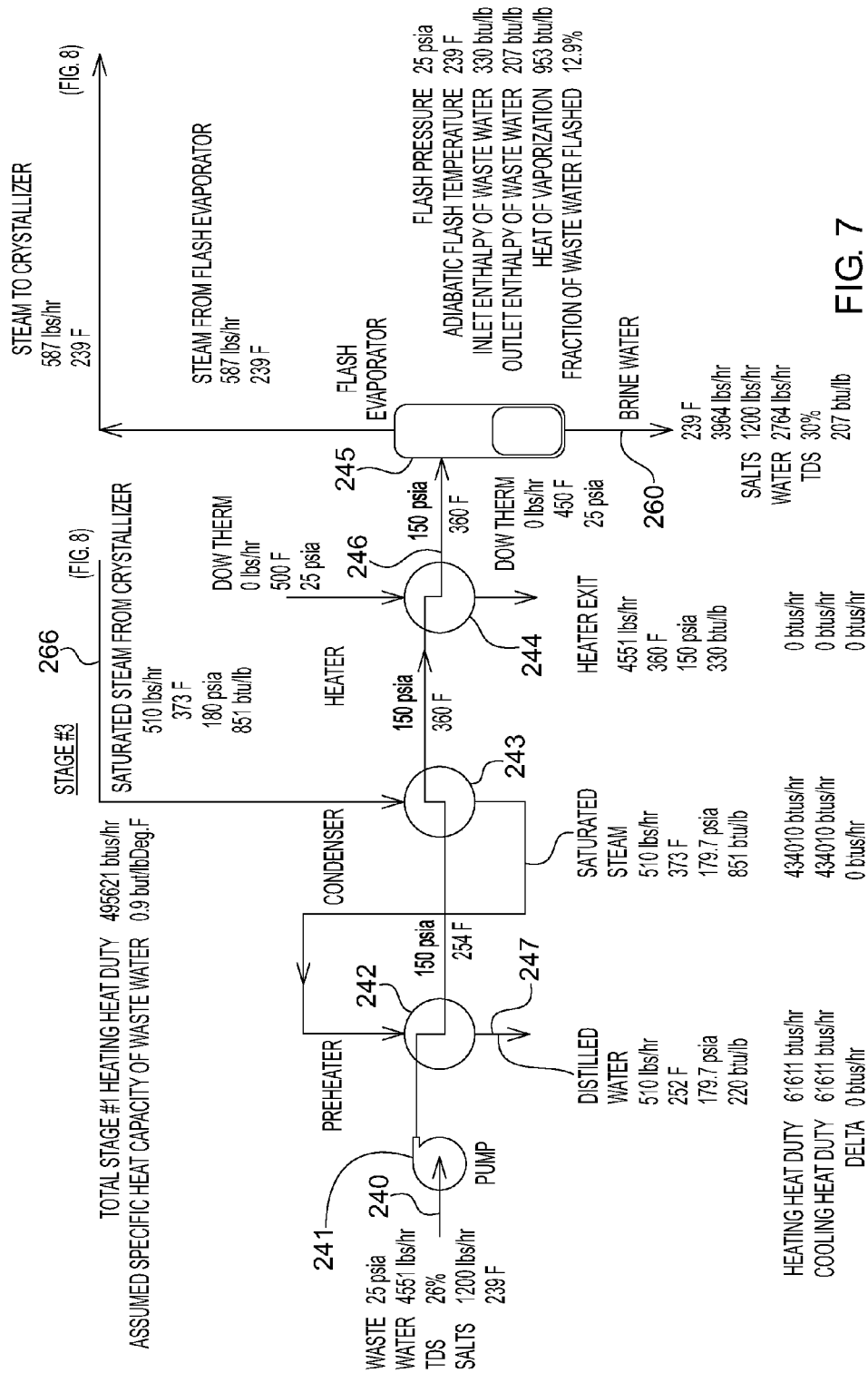

FIGS. 5-8 illustrate a further embodiment of the present invention. FIGS. 5, 6 and 7 will be individually discussed, but first their general relation to each other in an exemplary multi-stage system will be described. FIG. 5 shows Stage #1. This first stage takes in waste water at an inlet 200, processes it and produces first stage brine water at an outlet 220 of the first stage. The first stage brine water from the outlet 220 is input to the second stage shown in FIG. 6 (Stage #2) for additional processing, and a resulting second stage brine water is produced as an output at outlet 240. Similarly, the brine water from outlet 240 of the second stage is supplied as an input to the third stage shown in FIG. 7 (Stage #3) that has additional processing, resulting in a third stage output of brine water at an outlet 260.

It will be seen and appreciated by one skilled in the art how the successive stages of FIGS. 5, 6 and 7 increase the concentration of salts in the brine water (e.g., Total Dissolved Solids—"TDS"). It will also be appreciated how the number of stages is a variable that can be chosen according to various factors including, but not limited to, the salts content of the original waste water and the desired salt content after concentration. In general, a system in accordance with these exemplary embodiments may include any one or more stages such as are shown, for example, in FIGS. 5-7. The examples presented herein are merely illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 5-8, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 5, the waste water progresses from the input 200 to the output 240 successively through a pump 201, a preheater 202, a condenser 203, and a flash evaporator 205. One alternative is to have, in place of a single preheater 202, a series of preheaters or heat exchangers. The heating medium for the preheater 202 can be excess steam available from a crystallizer 265 (see FIG. 8) and/or hot water from the condenser 203.

In this example, the pump 201, preheater 202, and condenser 203 elevate the waste water pressure to 150 psia and the temperature to 360° F. at the inlet 206 to the flash evaporator 205 without use of any heater elements between the condenser 203 and flash evaporator 205. The pump 201 elevates the pressure from 14.7 psia (1 atm) to 150 psia. The level of pressurization of waste water in all stages is such that there is no boiling of the waste water inside and across the heat exchanger surfaces of all heat exchangers used in this system. This is done to prevent the formation of deposits (scales, fouling etc.) on the heat exchanger surfaces. The preheater 202 elevates the temperature from 60° F. to 134° F., while the condenser 202 further elevates the temperature to 360° F. Additionally, the preheater 202 produces distilled water at outlet 207.

For drawing convenience, each concentration Stage (FIGS. 5-7) shows a heater (e.g., heater 204 in FIG. 5, heater 224 in FIG. 6, heater 244 in FIG. 7) which may be omitted entirely or, if present, not supplied with any heating fluid. As shown in FIGS. 5-7, that heater 204, 224, 244 has zero input and zero output of heating fluid (e.g., DowTherm™). For system equipment economy, heater 204, 224, 244 is preferably omitted. However, systems may be arranged as shown and provide the option to operate or to not operate such a heater 204, 224, 244. Further explanation of what enables avoiding use of a heater 204, 224, 244 is given below.

One aspect of Stage #1 of FIG. 5 is, as shown in the legend to the right of the flash evaporator 205, that it is operated so the flash pressure, i.e., the downstream or output pressure of the flash evaporator 205, is approximately 25 psia, contrasting with the input or upstream pressure of 150 psia. The effect of this change in the pressure is that a portion of the water component of the waste water is separated from the dissolved solids in the form of steam. The remaining waste water becomes more concentrated in dissolved solids and exits the flash evaporator at outlet 220.

Figure 8:
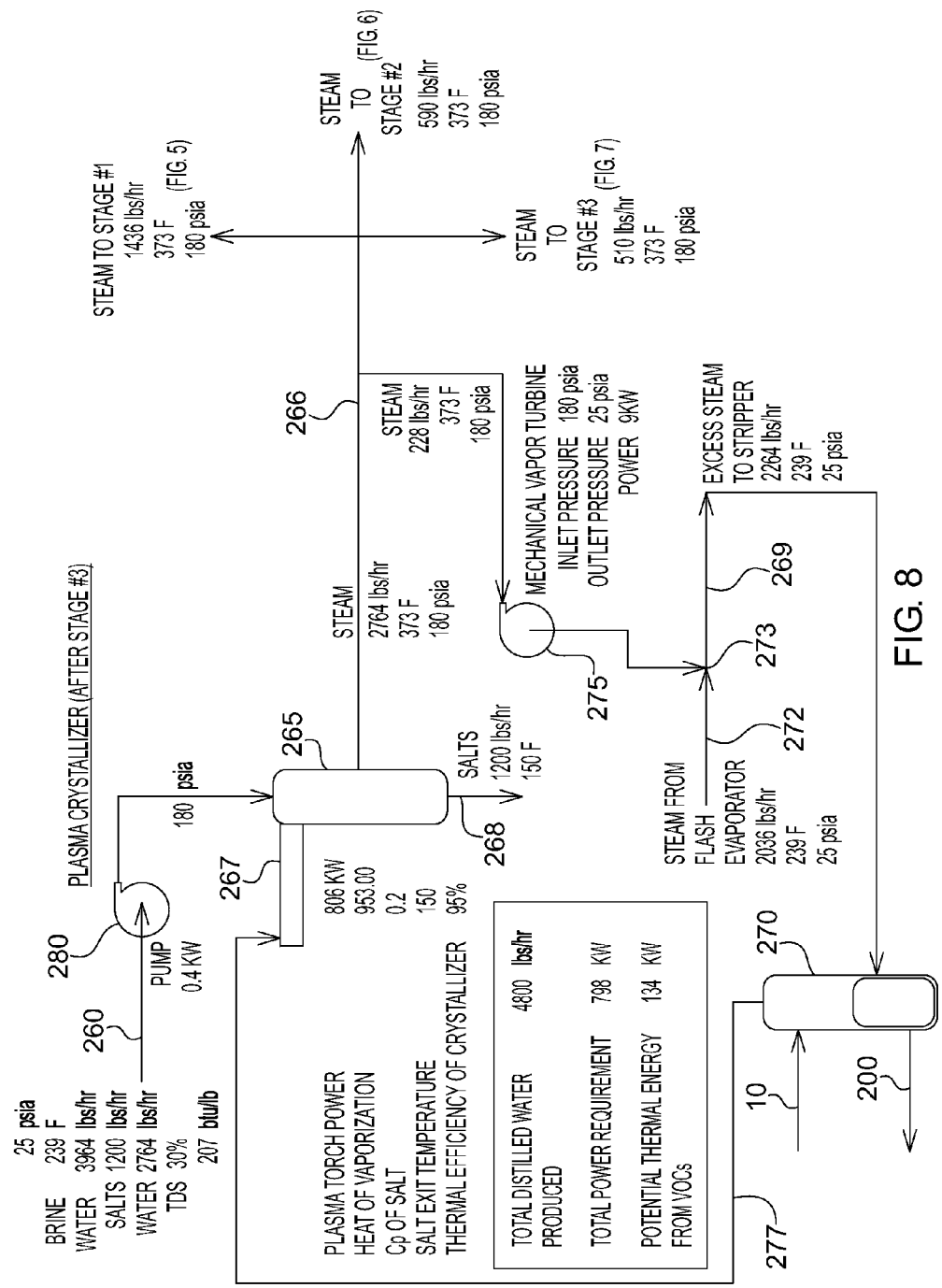
FIG. 8 is a schematic flow diagram of an exemplary thermal reactor configured for use with water treatment stages such as those shown in FIGS. 5-7 in accordance with the further embodiment of the present invention.

The condenser 203 receives some saturated steam directly from the crystallizer 265 of FIG. 8 at line 266 which, with the preheater 202 elevating the waste water temperature from 60° F. to 134° F. before the condenser 203, provides waste water at 360° F. from the condenser 203 and, favorably, there no need for the presence or operation of the heater 204. Under certain operating conditions, the steam addition from the crystallizer 265 may be negative, i.e., steam is sent as excess to the crystallizer 265 for other uses (e.g., as a heat source for the stripper 270).

The Stage #1 output 220 has the volume of waste water reduced from the input 200 with the salts more concentrated to approximately 23% TDS, which is increased from the initial approximately 20% TDS in the exemplary waste water at the input 200.

Stages #2 and #3 in FIGS. 6 and 7, respectively, have essentially the same equipment as shown in FIG. 5 for Stage #1 but with some different operating parameters as shown in the legends of FIGS. 6-7. Each of Stages #2 and #3 may also omit, or not operate, a heater between the condenser and flash evaporator of that stage.

Referring to FIG. 6 (Stage #2), the brine water progresses from the input 200 to the output 240 successively through a pump 221, a preheater 222, a condenser 223, and a flash evaporator 225. One alternative is to have, in place of a single preheater 222, a series of preheaters or heat exchangers. The heating medium for the preheater 222 can be excess steam available from a crystallizer 265 (see FIG. 8) and/or hot water from the condenser 223.

In this example, the pump 221, preheater 222, and condenser 223 elevate the waste water pressure to 150 psia and the temperature to 360° F. at the inlet 226 to the flash evaporator 225 without use of any heater elements between the condenser 223 and flash evaporator 225. The pump 221 elevates the pressure from 25 psia to 150 psia. The preheater 222 elevates the temperature from 239° F. to 253° F., while the condenser 222 further elevates the temperature to 360° F. Additionally, the preheater 222 produces distilled water at outlet 227.

One aspect of Stage #2 of FIG. 6 is, as shown in the legend to the right of the flash evaporator 225, that it is operated so the flash pressure, i.e., the downstream or output pressure of the flash evaporator 225, is approximately 25 psia, contrasting with the input or upstream pressure of 150 psia. The effect of this change in the pressure is that a portion of the water component of the waste water is separated from the dissolved solids in the form of steam. The remaining waste water becomes more concentrated in dissolved solids and exits the flash evaporator at outlet 240.

The condenser 223 receives some saturated steam directly from the crystallizer 265 of FIG. 8 at line 266 which, with the preheater 222 elevating the waste water temperature from 239° F. to 253° F. before the condenser 223, provides waste water at 360° F. from the condenser 223 and, favorably, there no need for the presence or operation of the heater 224. Under certain operating conditions, the steam addition from the crystallizer 265 may be negative, i.e., steam is sent as excess to the crystallizer 265 for other uses (e.g., as a heat source for the stripper 270).

The Stage #2 output 240 has the volume of waste water reduced from the input 220 with the salts more concentrated to approximately 26% TDS, which is increased from the initial approximately 23% TDS in the exemplary waste water at the input 220.

Referring to FIG. 7 (Stage #3), the brine water progresses from the input 240 to the output 260 successively through a pump 241, a preheater 242, a condenser 243, and a flash evaporator 245. One alternative is to have, in place of a single preheater 242, a series of preheaters or heat exchangers. The heating medium for the preheater 242 can be excess steam available from a crystallizer 265 (see FIG. 8) and/or hot water from the condenser 243.

In this example, the pump 241, preheater 242, and condenser 243 elevate the waste water pressure to 150 psia and the temperature to 360° F. at the inlet 246 to the flash evaporator 245 without use of any heater elements between the condenser 243 and flash evaporator 245. The pump 241 elevates the pressure from 25 psia to 150 psia. The preheater 242 elevates the temperature from 239° F. to 254° F., while the condenser 242 further elevates the temperature to 360° F. Additionally, the preheater 242 produces distilled water at outlet 247.

One aspect of Stage #3 of FIG. 7 is, as shown in the legend to the right of the flash evaporator 245, that it is operated so the flash pressure, i.e., the downstream or output pressure of the flash evaporator 245, is approximately 25 psia, contrasting with the input or upstream pressure of 150 psia. The effect of this change in the pressure is that a portion of the water component of the waste water is separated from the dissolved solids in the form of steam. The remaining waste water becomes more concentrated in dissolved solids and exits the flash evaporator at outlet 260.

The condenser 243 receives some saturated steam directly from the crystallizer 265 of FIG. 8 at line 266 which, with the preheater 242 elevating the waste water temperature from 239° F. to 254° F. before the condenser 243, provides waste water at 360° F. from the condenser 243 and, favorably, there no need for the presence or operation of the heater 244. Under certain operating conditions, the steam addition from the crystallizer 265 may be negative, i.e., steam is sent as excess to the crystallizer 265 for other uses (e.g., as a heat source for the stripper 270).

The Stage #3 output 260 has the volume of waste water reduced from the input 240 with the salts more concentrated to approximately 30% TDS, which is increased from the initial approximately 26% TDS in the exemplary waste water at the input 220.

The exemplary system includes multiple (three) concentration stages (FIGS. 5-7) that are substantially alike in the combination of equipment used. However, other exemplary systems with multiple concentration stages may have individual stages of more varied combinations of equipment without departing from the spirit and scope of the present invention.

The level of pressurization of waste water in all stages is such that there is no boiling (nucleate or other type) of the waste water inside and across the heat exchanger surfaces of the condensers and preheaters of each stage. This prevents the formation of deposits (scales, fouling etc.) on the heat exchanger surfaces and reduces the requirement for cleaning of the heat exchangers. This results in the reduction of the operating cost.

FIG. 8 represents an example of applying the output brine water (line 260) of the Stage #3 treatment (FIG. 7) to a plasma crystallizer 265. The plasma crystallizer 265 is an example of a known pyrolytic reactor that can be used to finish separation of water from salts dissolved in it. One skilled in the relevant art will appreciate, however, that other thermal reactors may also be used without departing from the spirit and scope of the present invention. The example of a plasma reactor, which can be consistent with known plasma gasification/vitrification reactors, operated with one or more plasma torches 267, as is well-known in published literature, is believed to provide opportunity for a favorable cost-benefit ratio.

In general, for multistage operation, the plasma crystallizer 265 (or other reactor) is utilized at the final concentration stage when the output brine water has been concentrated to a desired level, as described in the above example. It can also be suitable to have a multistage system not only for salts concentration (as in FIGS. 5-7), but also a separation subsystem with a reactor after any individual one of the early concentration stages (e.g., after either, or both, of Stages #1 and #2). However, it is generally more cost effective to have a single separation subsystem after the last of a determined number of concentration stages for the desired separation.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 8, the crystallizer 265 has a salts output at an outlet 268 equivalent to the total salts content of the original wastewater. The water output of the total system is now recovered as clean distilled water from the preheaters 202, 222, 242 of the respective Stages of FIGS. 5-7, and/or may also be recovered directly from steam exiting the crystallizer 265.

FIG. 8 shows brine water 260 entering the crystallizer 265 via a pump 280 that raises the pressure to 180 psia. FIG. 8 also shows how steam from the crystallizer 265 can be redirected back to the respective earlier Stages of FIGS. 5-7. The steam output from the crystallizer 265 at line 266 may be provided back to the various Stages #1, #2 and #3 and used for heating by the respective preheaters and condensers therein. Also, FIG. 8 shows an "Excess Steam to Stripper" of a certain amount at line 269. This steam 269 is used in a stripper 270 which is utilized to remove volatile organic compounds ("VOCs") from the waste water before processing. Some excess steam from the crystallizer 265 may also be used for other purposes, e.g., to preheat the input waste water in a preheater or condenser.

Before treatment in the Stages shown in FIGS. 5-7, the incoming waste water 10 can be, for example, sent to the stripper 270 where the steam 269 is used to remove VOCs from the waste water 10. FIG. 8 shows steam from concentration Stages #1, #2 and #3 at an input 272 joined at a junction 273 with exiting steam from the crystallizer 265 that has been reduced in pressure by expansion in a mechanical vapor turbine 275 to recover energy and reduce the total amount of energy used in the process. The excess steam 269 can be used directly in the stripper 270, as shown in FIG. 8, or used to heat air in a separate heat exchanger where the heated air is then used in the stripper to remove the VOCs. The stripped waste water is sent as feed to the input 200 to Stage #1 of FIG. 5. The VOCs which are removed from the waste water 10 exit the stripper through a conduit 277 which connects to the plasma crystallizer 265. Additionally or alternatively, a condenser with a knock-out pot (not shown) can be used between the plasma crystallizer 265 and the stripper 270 with the condensed VOCs (as well as any stripped VOCs) fed directly to the plasma crystallizer 265. The VOCs are fed in front of the plasma torch 267 (e.g., along with brine water 260 from Stage #3 from the pump 280) such that they intensely mix with the high temperature gases exiting from the plasma torch 267. The plasma torch 267 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 265, along with heat inputted through the plasma torch 267, to vaporize the water from the brine water 260. This reduces the amount of heat and the corresponding amount of electricity utilized in the plasma crystallizer 265, thus increasing its cost effectiveness.

The steam exiting the plasma crystallizer 265 can be periodically vented to the atmosphere (not shown) to keep the levels of non-condensable gases low enough such that they do not degrade the performance of the heat exchangers used in the inventive system and process.

It is therefore seen that systems and processes in accordance with the further embodiment of the present invention can make use of known and available components, such as, for example, flash evaporators for concentration of salts and plasma (or other) gasifier reactors for crystallization (or vitrification) of the salts, in particular innovative ways with insight as to both the capital cost and the operating cost. A need for such cost effective water treatment has been heightened by practices such as the use of large amounts of water in natural gas drilling However, the present invention may be used in any situation where impurities to be removed exist.

In general summary, but without limitation, the further embodiment of the present invention can be characterized in the following ways, for example: A system, and a corresponding method, in which waste water is supplied to one or more stages of equipment including a pump for pressurizing the water (e.g., to at least about 10 times atmospheric pressure), a heater that heats the pressurized water well above normal boiling temperature, a flash evaporator, or other device, that receives the heated, pressurized water and results in fluid evaporation and concentration of solids that were in the wastewater, and, for instances in which the brine water with concentrated solids cannot be otherwise readily and safely disposed of, a thermal or pyrolytic reactor to crystallize or otherwise yield a form of the solids that can be readily and safely disposed of, such a reactor may also be applied as a heater for the original incoming waste water. Also, or alternatively, such a reactor may be used to form a vitrified glass of the salts output of any water treatment system that produces a brine water.

Furthermore, the examples provided herein show how use can be made of flash evaporators operated at reduced downstream pressure (e.g., 25 psia compared to 150 psia upstream pressure) along with an expander (e.g., turbine), for energy recovery from the steam output of a crystallizer. All of which is believed to contribute significantly to reduced operating costs which can be very beneficial, even though initial capital costs may be increased.

Figure 9:
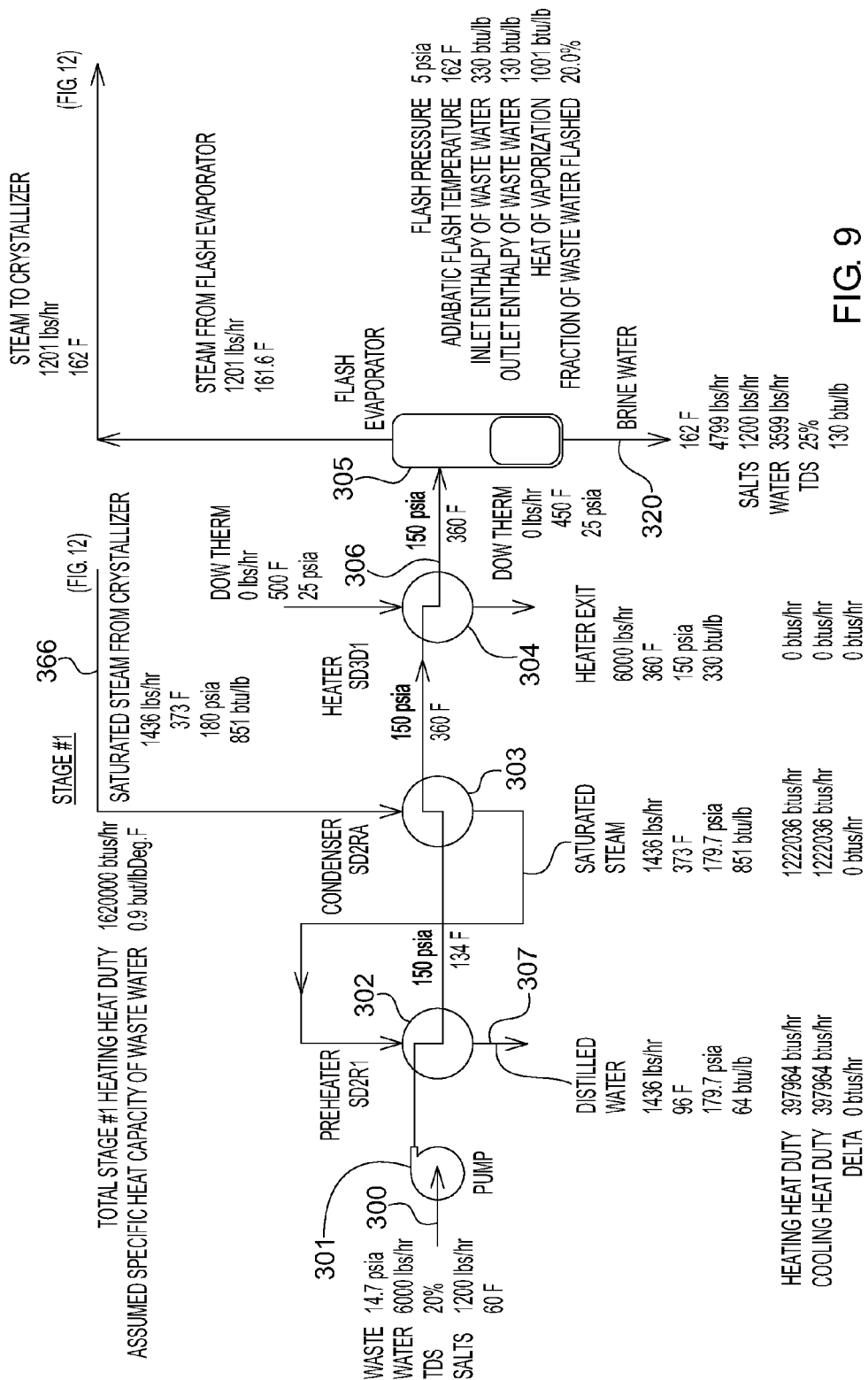
FIGS. 9, 10 and 11 are schematic flow diagrams of particular examples of stages of a treatment system in accordance with yet a further embodiment of the present invention.
Figure 10:
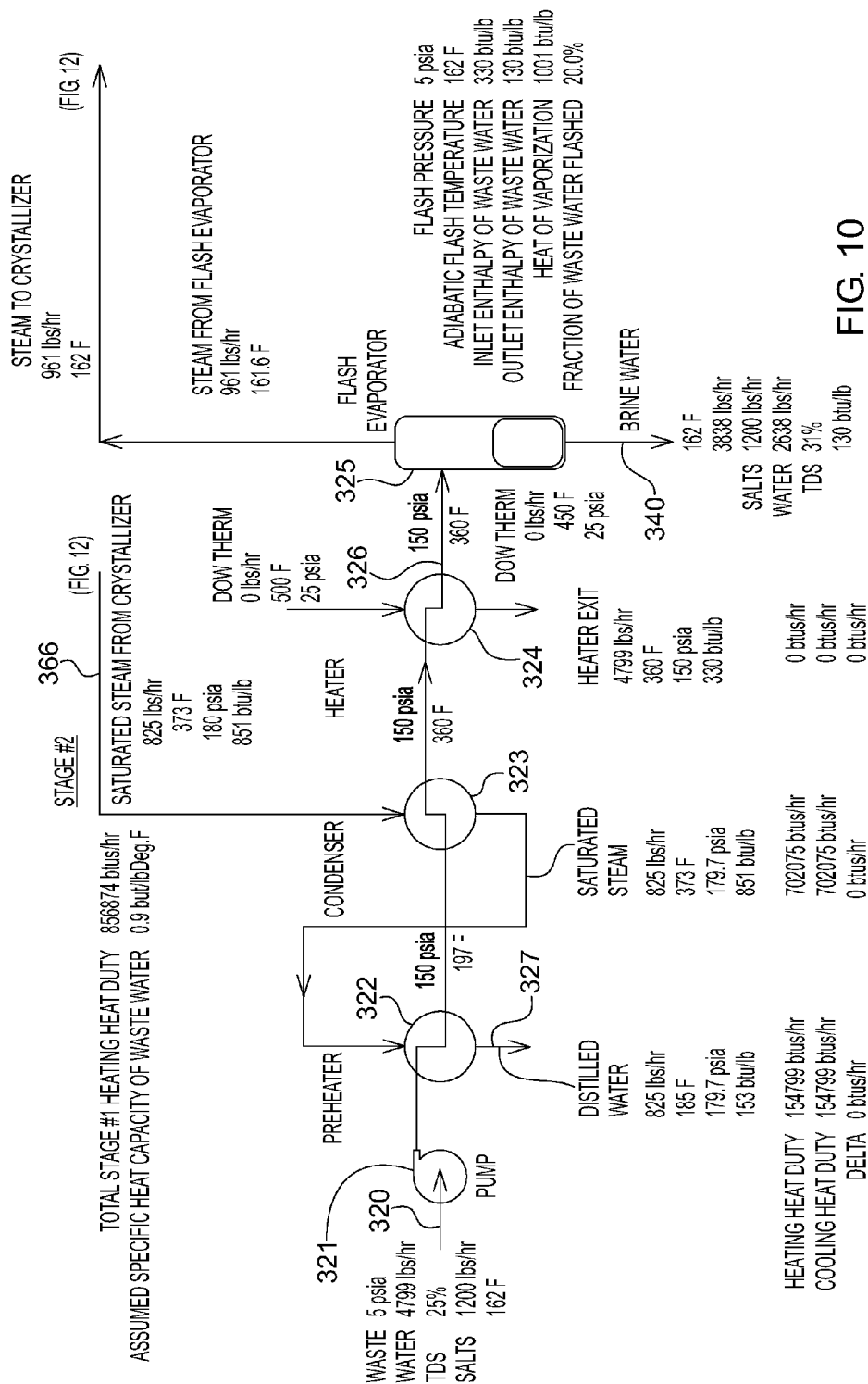
Figure 11:
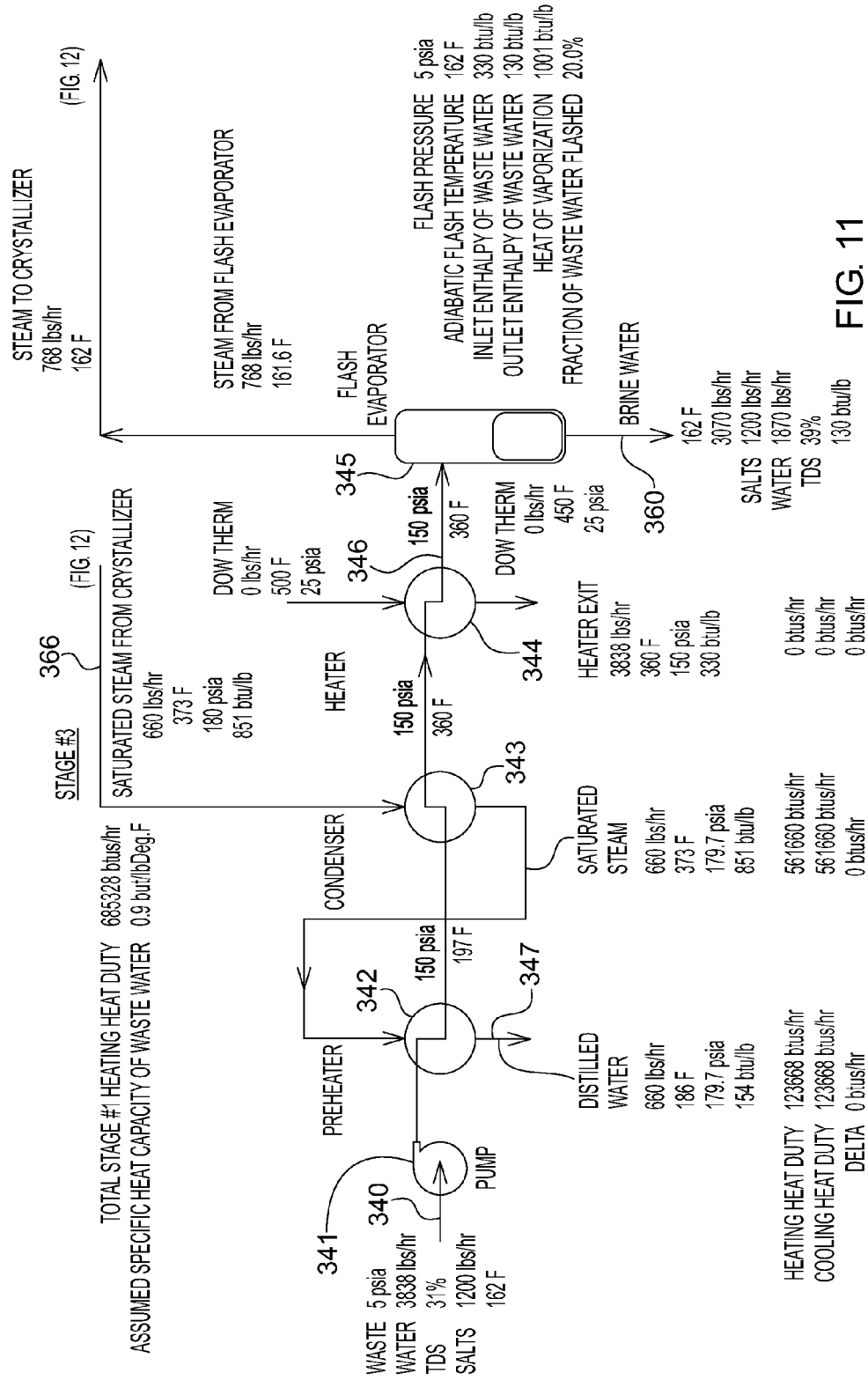

FIGS. 9-12 illustrate yet a further embodiment of the present invention. FIGS. 9, 10 and 11 will be individually discussed, but first their general relation to each other in an exemplary multi-stage system will be described. FIG. 9 shows Stage #1. This first stage takes in waste water at an inlet 300, processes it and produces first stage brine water at an outlet 320 of the first stage. The first stage brine water from the outlet 320 is input to the second stage shown in FIG. 10 (Stage #2) for additional processing, and a resulting second stage brine water is produced as an output at outlet 340. Similarly, the brine water from outlet 340 of the second stage is supplied as an input to the third stage shown in FIG. 11 (Stage #3) that has additional processing, resulting in a third stage output of brine water at an outlet 360.

It will be seen and appreciated by one skilled in the art how the successive stages of FIGS. 9, 10 and 11 increase the concentration of salts in the brine water (e.g., Total Dissolved Solids—"TDS"). It will also be appreciated how the number of stages is a variable that can be chosen according to various factors including, but not limited to, the salts content of the original waste water and the desired salt content after concentration. In general, a system in accordance with these exemplary embodiments may include any one or more stages such as are shown, for example, in FIGS. 9-11. The examples presented herein are merely illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 9-12, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 9, the waste water progresses from the input 300 to the output 340 successively through a pump 301, a preheater 302, a condenser 303, and a flash evaporator 305. One alternative is to have, in place of a single preheater 302, a series of preheaters or heat exchangers. The heating medium for the preheater 302 can be excess steam available from a crystallizer 365 (see FIG. 12) and/or hot water from the condenser 303.

In this example, the pump 301, preheater 302, and condenser 303 elevate the waste water pressure to 150 psia and the temperature to 360° F. at the inlet 306 to the flash evaporator 305 without use of any heater elements between the condenser 303 and flash evaporator 305. The pump 301 elevates the pressure from 14.7 psia (1 atm) to 150 psia. The level of pressurization of waste water in all stages is such that there is no boiling of the waste water inside and across the heat exchanger surfaces of all heat exchangers used in this system. This is done to prevent the formation of deposits (scales, fouling, etc.) on the heat exchanger surfaces. The preheater 302 elevates the temperature from 60° F. to 134° F., while the condenser 302 further elevates the temperature to 360° F. Additionally, the preheater 302 produces distilled water at outlet 307.

For drawing convenience, each concentration Stage (FIGS. 9-11) shows a heater (e.g., heater 304 in FIG. 9, heater 324 in FIG. 10, heater 344 in FIG. 11) between the condenser and flash evaporator, which may be omitted entirely or, if present, not supplied with any heating fluid. As shown in FIGS. 9-11, that heater 304, 324, 344 has zero input and zero output of heating fluid (e.g., DowTherm™). For system equipment economy, heater 304, 324, 344 is preferably omitted. However, systems may be arranged as shown and provide the option to operate or to not operate such a heater 304, 324, 344. Further explanation of what enables avoiding use of a heater 304, 324, 344 is given below.

One aspect of Stage #1 of FIG. 9 is, as shown in the legend to the right of the flash evaporator 305, that it is operated so the flash pressure, i.e., the downstream or output pressure of the flash evaporator 305, is approximately 5 psia, contrasting with the input or upstream pressure of 150 psia and the flash pressure of 25 psia in FIGS. 5-8. The effect of this change in the pressure is that a larger portion of the water component of the waste water is separated from the dissolved solids in the form of steam. The remaining waste water becomes more concentrated in dissolved solids and exits the flash evaporator at outlet 320.

Figure 12:
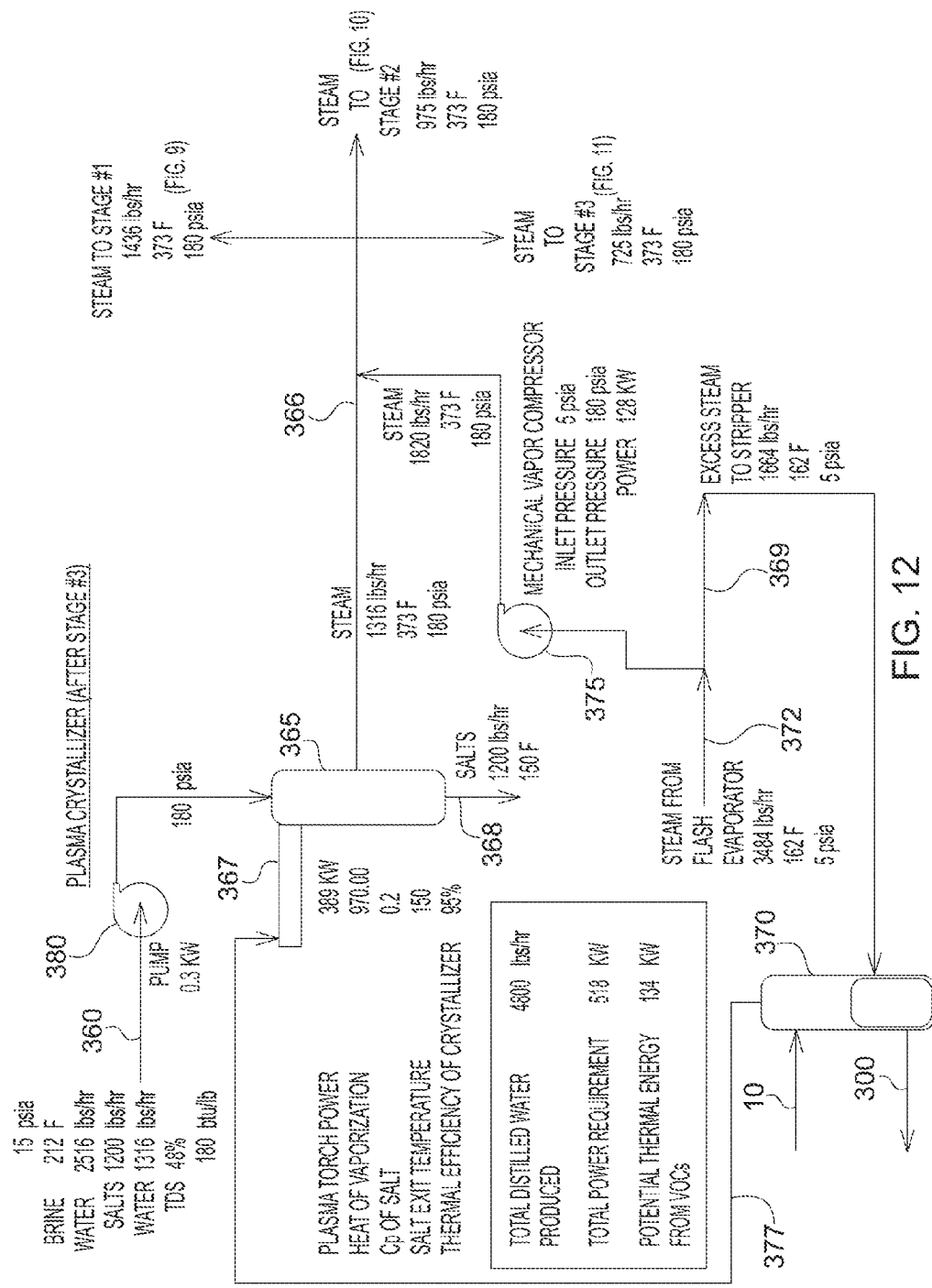
FIG. 12 is a schematic flow diagram of an exemplary thermal reactor configured for use in a water treatment system in conjunction with treatment stages and elements such as those shown in FIGS. 9-11 in accordance with yet a further embodiment of the present invention.

The condenser 303 receives some saturated steam directly from the crystallizer 365 of FIG. 12 at line 366 which, with the preheater 302 elevating the waste water temperature from 60° F. to 134° F. before the condenser 303, provides waste water at 360° F. from the condenser 303 and, favorably, there no need for the presence or operation of the additional heater 304. Under certain operating conditions, the steam addition from the crystallizer 365 may be negative, i.e., steam is sent as excess to the crystallizer 365 for other uses (e.g., as a heat source for the stripper 370).

The Stage #1 output 320 has the volume of waste water reduced from the input 300 with the salts more concentrated to approximately 25% TDS, which is increased from the initial approximately 20% TDS in the exemplary waste water at the input 300.

Stages #2 and #3 in FIGS. 10 and 11, respectively, have essentially the same equipment as shown in FIG. 9 for Stage #1 but with some different operating parameters as shown in the legends of FIGS. 10-11. Each of Stages #2 and #3 may also omit, or not operate, a heater between the condenser and flash evaporator of that stage.

Referring to FIG. 10 (Stage #2), the brine water progresses from the input 300 to the output 340 successively through a pump 321, a preheater 322, a condenser 323, and a flash evaporator 325. One alternative is to have, in place of a single preheater 322, a series of preheaters or heat exchangers. The heating medium for the preheater 322 can be excess steam available from a crystallizer 365 (see FIG. 12) and/or hot water from the condenser 323.

In this example, the pump 321, preheater 322, and condenser 323 elevate the waste water pressure to 150 psia and the temperature to 360° F. at the inlet 326 to the flash evaporator 325 without use of any heater elements between the condenser 323 and flash evaporator 325. The pump 321 elevates the pressure from 5 psia to 150 psia. The preheater 322 elevates the temperature from 162° F. to 197° F., while the condenser 322 further elevates the temperature to 360° F. Additionally, the preheater 322 produces distilled water at outlet 327.

One aspect of Stage #2 of FIG. 10 is, as shown in the legend to the right of the flash evaporator 325, that it is operated so the flash pressure, i.e., the downstream or output pressure of the flash evaporator 325, is approximately 5 psia, contrasting with the input or upstream pressure of 150 psia and the flash pressure of 25 psia in FIGS. 5-8. The effect of this change in the pressure is that a larger portion of the water component of the waste water is separated from the dissolved solids in the form of steam. The remaining waste water becomes more concentrated in dissolved solids and exits the flash evaporator at outlet 340.

The condenser 323 receives some saturated steam directly from the crystallizer 365 of FIG. 12 at line 366 which, with the preheater 322 elevating the waste water temperature from 162° F. to 197° F. before the condenser 323, provides waste water at 360° F. from the condenser 323 and, favorably, there no need for the presence or operation of the heater 324. Under certain operating conditions, the steam addition from the crystallizer 365 may be negative, i.e., steam is sent as excess to the crystallizer 365 for other uses (e.g., as a heat source for the stripper 370).

The Stage #2 output 340 has the volume of waste water reduced from the input 320 with the salts more concentrated to approximately 31% TDS, which is increased from the initial approximately 25% TDS in the exemplary waste water at the input 320.

Referring to FIG. 11 (Stage #3), the brine water progresses from the input 340 to the output 360 successively through a pump 341, a preheater 342, a condenser 343, and a flash evaporator 345. One alternative is to have, in place of a single preheater 342, a series of preheaters or heat exchangers. The heating medium for the preheater 342 can be excess steam available from a crystallizer 365 (see FIG. 12) and/or hot water from the condenser 343.

In this example, the pump 341, preheater 342, and condenser 343 elevate the waste water pressure to 150 psia and the temperature to 360° F. at the inlet 346 to the flash evaporator 345 without use of any heater elements between the condenser 343 and flash evaporator 345. The pump 341 elevates the pressure from 5 psia to 150 psia. The preheater 342 elevates the temperature from 162° F. to 197° F., while the condenser 342 further elevates the temperature to 360° F. Additionally, the preheater 342 produces distilled water at outlet 347.

One aspect of Stage #3 of FIG. 11 is, as shown in the legend to the right of the flash evaporator 345, that it is operated so the flash pressure, i.e., the downstream or output pressure of the flash evaporator 345, is approximately 5 psia, contrasting with the input or upstream pressure of 150 psia and the flash pressure of 25 psia in FIGS. 5-8. The effect of this change in the pressure is that a larger portion of the water component of the waste water is separated from the dissolved solids in the form of steam. The remaining waste water becomes more concentrated in dissolved solids and exits the flash evaporator at outlet 360.

The condenser 343 receives some saturated steam directly from the crystallizer 365 of FIG. 12 at line 366 which, with the preheater 342 elevating the waste water temperature from 162° F. to 197° F. before the condenser 343, provides waste water at 360° F. from the condenser 343 and, favorably, there no need for the presence or operation of the heater 344. Under certain operating conditions, the steam addition from the crystallizer 365 may be negative, i.e., steam is sent as excess to the crystallizer 365 for other uses (e.g., as a heat source for the stripper 370).

The Stage #3 output 360 has the volume of waste water reduced from the input 340 with the salts more concentrated to approximately 39% TDS, which is increased from the initial approximately 31% TDS in the exemplary waste water at the input 320.

The exemplary system includes multiple (three) concentration stages (FIGS. 9-11) that are substantially alike in the combination of equipment used. However, other exemplary systems with multiple concentration stages may have individual stages of more varied combinations of equipment without departing from the spirit and scope of the present invention.

The level of pressurization of waste water in all stages is such that there is no boiling (nucleate or other type) of the waste water inside and across the heat exchanger surfaces of the condensers and preheaters of each stage. This prevents the formation of deposits (scales, fouling, etc.) on the heat exchanger surfaces and reduces the requirement for cleaning of the heat exchangers. This results in the reduction of the operating cost.

FIG. 12 represents an example of applying the output brine water (line 360) of the Stage #3 treatment (FIG. 11) to a plasma crystallizer 365. The plasma crystallizer 365 is an example of a known pyrolytic reactor that can be used to finish separation of water from salts dissolved in it. One skilled in the relevant art will appreciate, however, that other thermal reactors may also be used without departing from the spirit and scope of the present invention. The example of a plasma reactor, which can be consistent with known plasma gasification/vitrification reactors, operated with one or more plasma torches 367, as is well-known in published literature, is believed to provide opportunity for a favorable cost-benefit ratio.

In general, for multistage operation, the plasma crystallizer 365 (or other reactor) is utilized at the final concentration stage when the output brine water has been concentrated to a desired level, as described in the above example. It can also be suitable to have a multistage system not only for salts concentration (as in FIGS. 9-11), but also a separation subsystem with a reactor after any individual one of the early concentration stages (e.g., after either, or both, of Stages #1 and #2). However, it is generally more cost effective to have a single separation subsystem after the last of a determined number of concentration stages for the desired separation.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 12, the crystallizer 365 has a salts output at an outlet 368 equivalent to the total salts content of the original wastewater. The water output of the total system is now recovered as clean distilled water from the preheaters 302, 322, 342 of the respective Stages of FIGS. 9-11, and/or may also be recovered directly from steam exiting the crystallizer 365.

FIG. 12 shows brine water 360 entering the crystallizer 365 via a pump 380 that raises the pressure to 180 psia. FIG. 12 also shows how steam from the crystallizer 365 can be redirected back to the respective earlier Stages of FIGS. 9-11. The steam output from the crystallizer 365 at line 366 may be provided back to the various Stages #1, #2 and #3 and used for heating by the respective preheaters and condensers therein. Also, FIG. 12 shows an "Excess Steam to Stripper" of a certain amount at line 369. This steam 369 is used in a stripper 370 which is utilized to remove volatile organic compounds ("VOCs") from the waste water before processing. Some excess steam from the crystallizer 365 may also be used for other purposes, e.g., to preheat the input waste water in a preheater or condenser.

Before treatment in the Stages shown in FIGS. 9-11, the incoming waste water 10 can be, for example, sent to the stripper 370 where the steam 369 is used to remove VOCs from the waste water 10. The excess steam 369 can be used directly in the stripper 370, as shown in FIG. 12, or used to heat air in a separate heat exchanger where the heated air is then used in the stripper to remove the VOCs. The stripped waste water is sent as feed to the input 300 to Stage #1 of FIG. 9. The VOCs which are removed from the waste water 10 exit the stripper through a conduit 377 which connects to the plasma crystallizer 365. Additionally or alternatively, a condenser with a knock-out pot (not shown) can be used between the plasma crystallizer 365 and the stripper 370 with the condensed VOCs (as well as any stripped VOCs) fed directly to the plasma crystallizer 365. The VOCs are fed in front of the plasma torch 367 (e.g., along with brine water 360 from Stage #3 from the pump 380) such that they intensely mix with the high temperature gases exiting from the plasma torch 367. The plasma torch is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 365, along with heat inputted through the plasma torch 367, to vaporize the water from the brine water 360. This reduces the amount of heat and the corresponding amount of electricity utilized in the plasma crystallizer 365, thus increasing its cost effectiveness.

The steam exiting the plasma crystallizer 365 can be periodically vented to the atmosphere (not shown) to keep the levels of non-condensable gases low enough such that they do not degrade the performance of the heat exchangers used in the inventive system and process.

FIG. 12 also shows some steam (e.g., about 36% of the input, in lbs/hr) from the flash evaporators 305, 325, 345 of concentration Stages #1, #2 and #3 at an input 372 goes to a compressor 375 that is elevated to 180 psia and a temperature of 373° F. for part of the steam that goes back to the treatment Stages of FIGS. 9-11.

It is therefore seen that systems and processes in accordance with the yet further embodiment of the present invention can make use of known and available components, such as, for example, flash evaporators for concentration of salts and plasma (or other) gasifier reactors for crystallization (or vitrification) of the salts, in particular innovative ways with insight as to both the capital cost and the operating cost. A need for such cost effective water treatment has been heightened by practices such as the use of large amounts of water in natural gas drilling However, the present invention may be used in any situation where impurities to be removed exist.

In general summary, but without limitation, the yet further embodiment of the present invention can be characterized in the following ways, for example: A system, and a corresponding method, in which waste water is supplied to one or more stages of equipment including a pump for pressurizing the water (e.g., to at least about 10 times atmospheric pressure), a heater that heats the pressurized water well above normal boiling temperature, a flash evaporator, or other device, that receives the heated, pressurized water and results in fluid evaporation and concentration of solids that were in the wastewater, and, for instances in which the brine water with concentrated solids cannot be otherwise readily and safely disposed of, a thermal or pyrolytic reactor to crystallize or otherwise yield a form of the solids that can be readily and safely disposed of, such a reactor may also be applied as a heater for the original incoming waste water. Also, or alternatively, such a reactor may be used to form a vitrified glass of the salts output of any water treatment system that produces a brine water.

Furthermore, the examples provided herein show how use can be made of flash evaporators operated at low downstream pressure (e.g., 5 psia or only about one-third of 1 atm) along with a compressor elevating the pressure of some steam from the flash evaporators to, e.g., 180 psia, before being added with steam from the reactor that goes back to the earlier concentrations Stages. All of which is believed to contribute significantly to reduced operating costs which can be very beneficial, even though initial capital costs may be increased.

Figure 13:
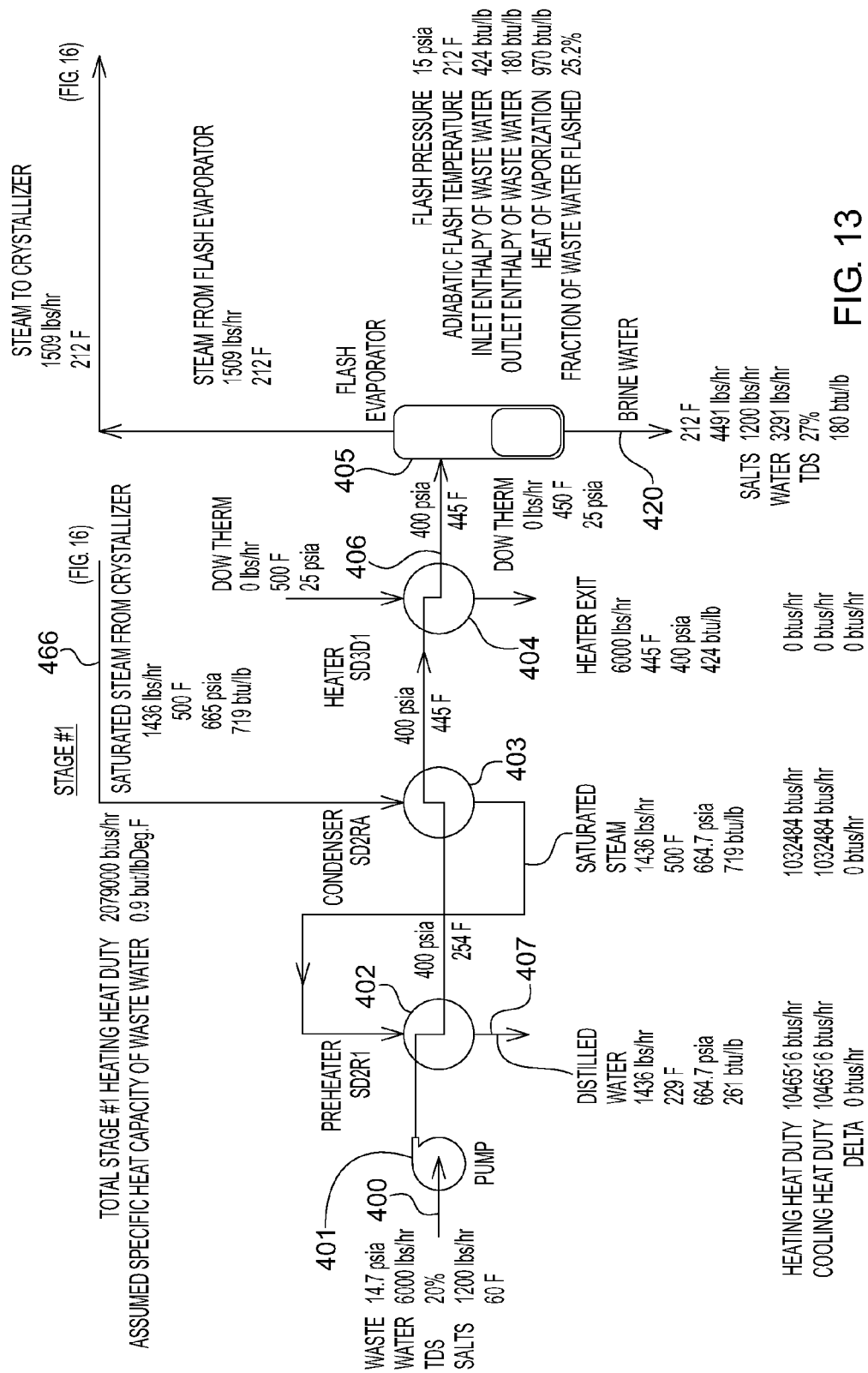
FIGS. 13, 14 and 15 are schematic flow diagrams of particular examples of stages of a treatment system in accordance with still a further embodiment of the present invention.
Figure 14:
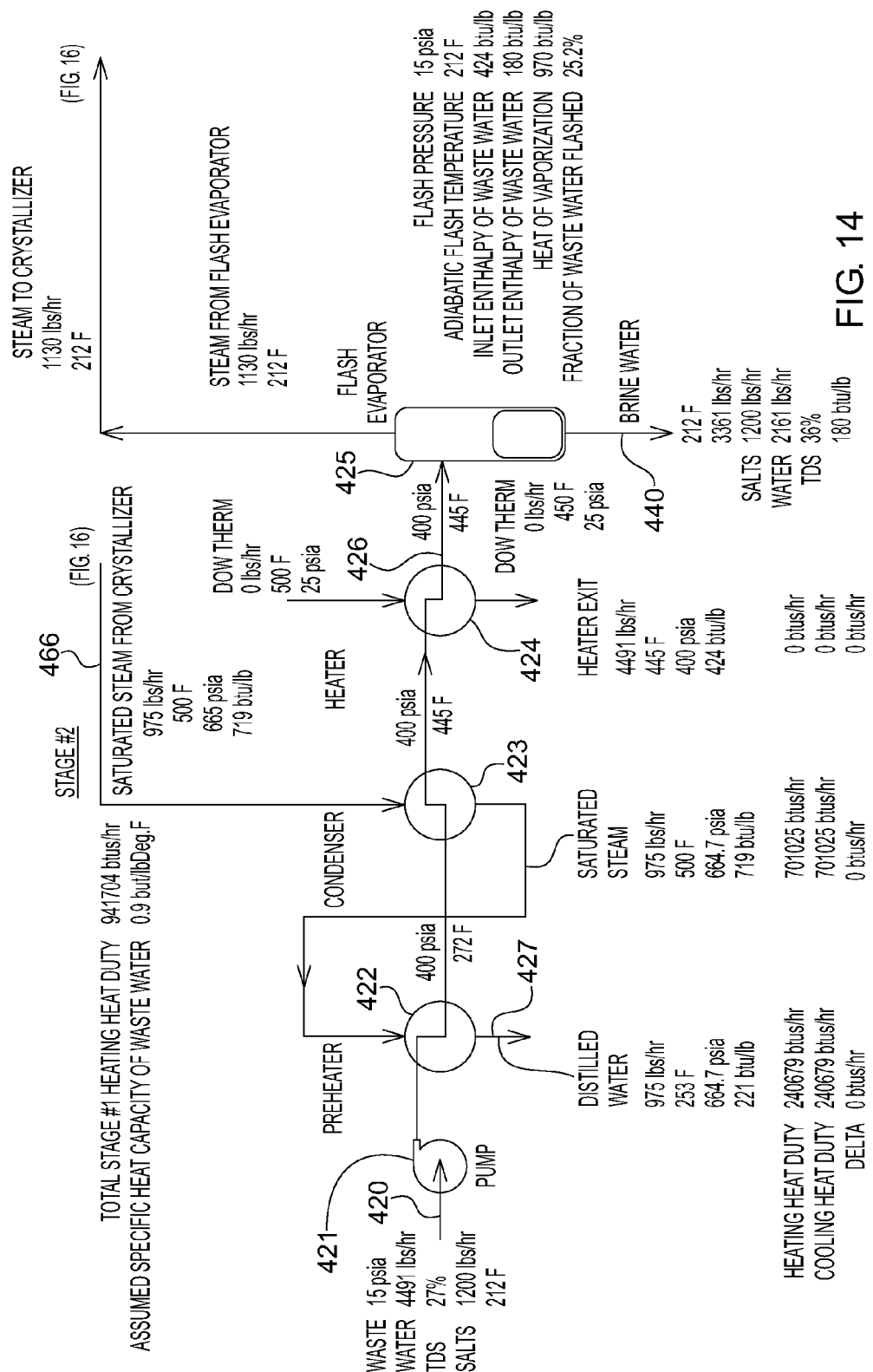
Figure 15:
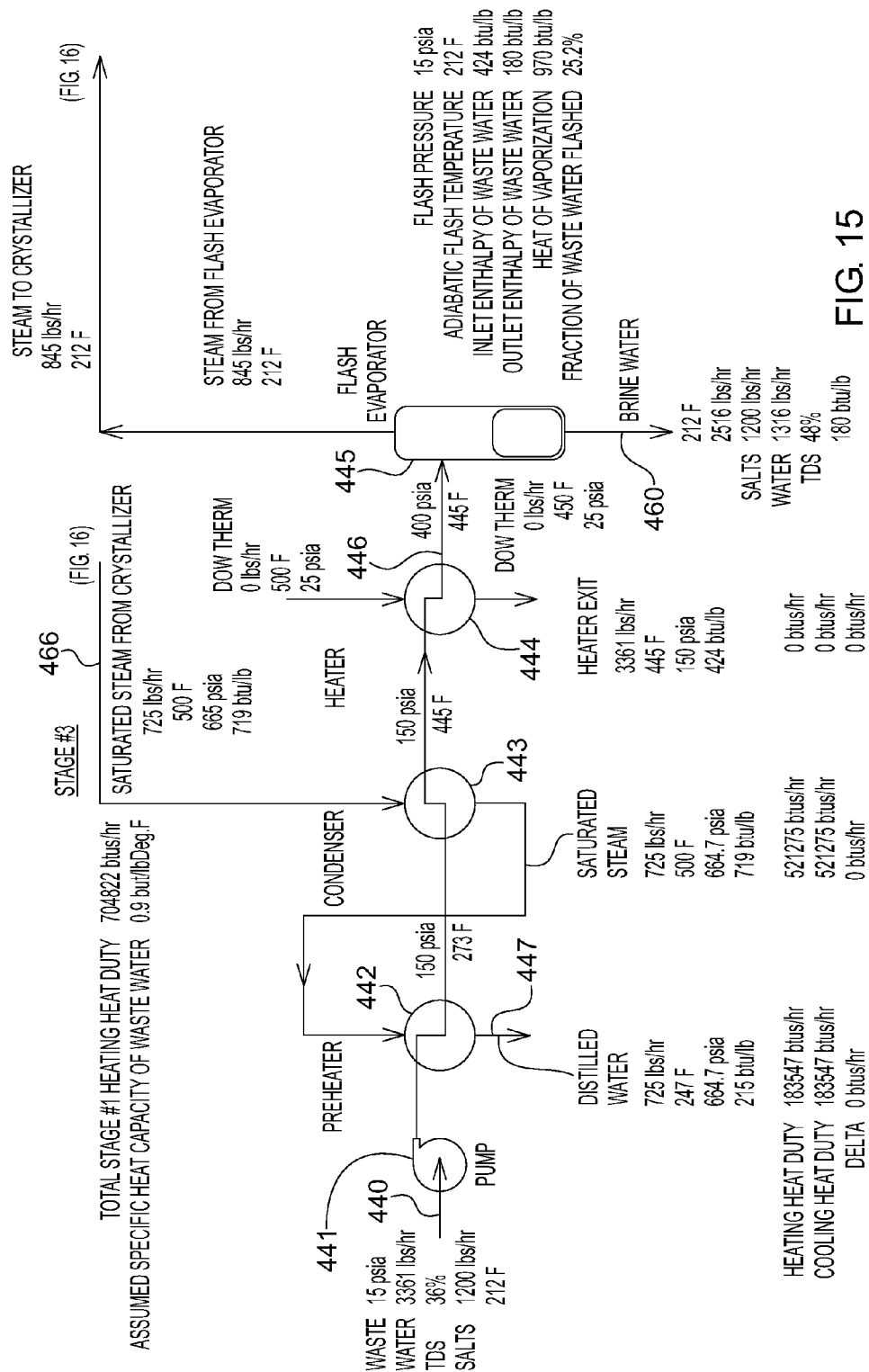

FIGS. 13-15 illustrate still a further embodiment of the present invention. FIGS. 13, 14 and 15 will be individually discussed, but first their general relation to each other in an exemplary multi-stage system will be described. FIG. 13 shows Stage #1. This first stage takes in waste water at an inlet 400, processes it and produces first stage brine water at an outlet 420 of the first stage. The first stage brine water from the outlet 420 is input to the second stage shown in FIG. 14 (Stage #2) for additional processing, and a resulting second stage brine water is produced as an output at outlet 440. Similarly, the brine water from outlet 440 of the second stage is supplied as an input to the third stage shown in FIG. 15 (Stage #3) that has additional processing, resulting in a third stage output of brine water at an outlet 460.

It will be seen and appreciated by one skilled in the art how the successive stages of FIGS. 13, 14 and 15 increase the concentration of salts in the brine water (e.g., Total Dissolved Solids—"TDS"). It will also be appreciated how the number of stages is a variable that can be chosen according to various factors including, but not limited to, the salts content of the original waste water and the desired salt content after concentration. In general, a system in accordance with these exemplary embodiments may include any one or more stages such as are shown, for example, in FIGS. 13-15. The examples presented herein are merely illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 13-16, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 13 (Stage #1), the waste water progresses from the input 400 to the output 440 successively through a pump 401, a preheater 402, a condenser 403, and a flash evaporator 405. One alternative is to have, in place of a single preheater 402, a series of preheaters or heat exchangers. The heating medium for the preheater 402 can be excess steam available from a crystallizer 465 (see FIG. 16) and/or hot water from the condenser 403.

In this example, the pump 401, preheater 402, and condenser 403 elevate the waste water pressure to 400 psia and the temperature to 445° F. at the inlet 406 to the flash evaporator 405 without use of any heater elements between the condenser 403 and flash evaporator 405. The pump 401 elevates the pressure from 14.7 psia (1 atm) to 400 psia. The level of pressurization of waste water in all stages is such that there is no boiling of the waste water inside and across the heat exchanger surfaces of all heat exchangers used in this system. This is done to prevent the formation of deposits (scales, fouling, etc.) on the heat exchanger surfaces. The preheater 402 elevates the temperature from 60° F. to 254° F., while the condenser 402 further elevates the temperature to 445° F. Additionally, the preheater 402 produces distilled water at outlet 407.

For drawing convenience, each concentration Stage (FIGS. 13-15) shows a heater (e.g., heater 404 in FIG. 13, heater 424 in FIG. 14, heater 444 in FIG. 15) between the condenser and flash evaporator, which may be omitted entirely or, if present, not supplied with any heating fluid. As shown in FIGS. 13-15, that heater 404, 424, 444 has zero input and zero output of heating fluid (e.g., DowTherm™). For system equipment economy, heater 404, 424, 444 is preferably omitted. However, systems may be arranged as shown and provide the option to operate or to not operate such a heater 404, 424, 444. Further explanation of what enables avoiding use of a heater 404, 424, 444 is given below.

One aspect of Stage #1 of FIG. 13 is, as shown in the legend to the right of the flash evaporator 405, that it is operated so the flash pressure, i.e., the downstream or output pressure of the flash evaporator 405, is approximately 15 psia, contrasting with the input or upstream pressure of 400 psia. The effect of this change in the pressure is that a larger portion of the water component of the waste water is separated from the dissolved solids in the form of steam. The remaining waste water becomes more concentrated in dissolved solids and exits the flash evaporator at outlet 420.

Figure 16:
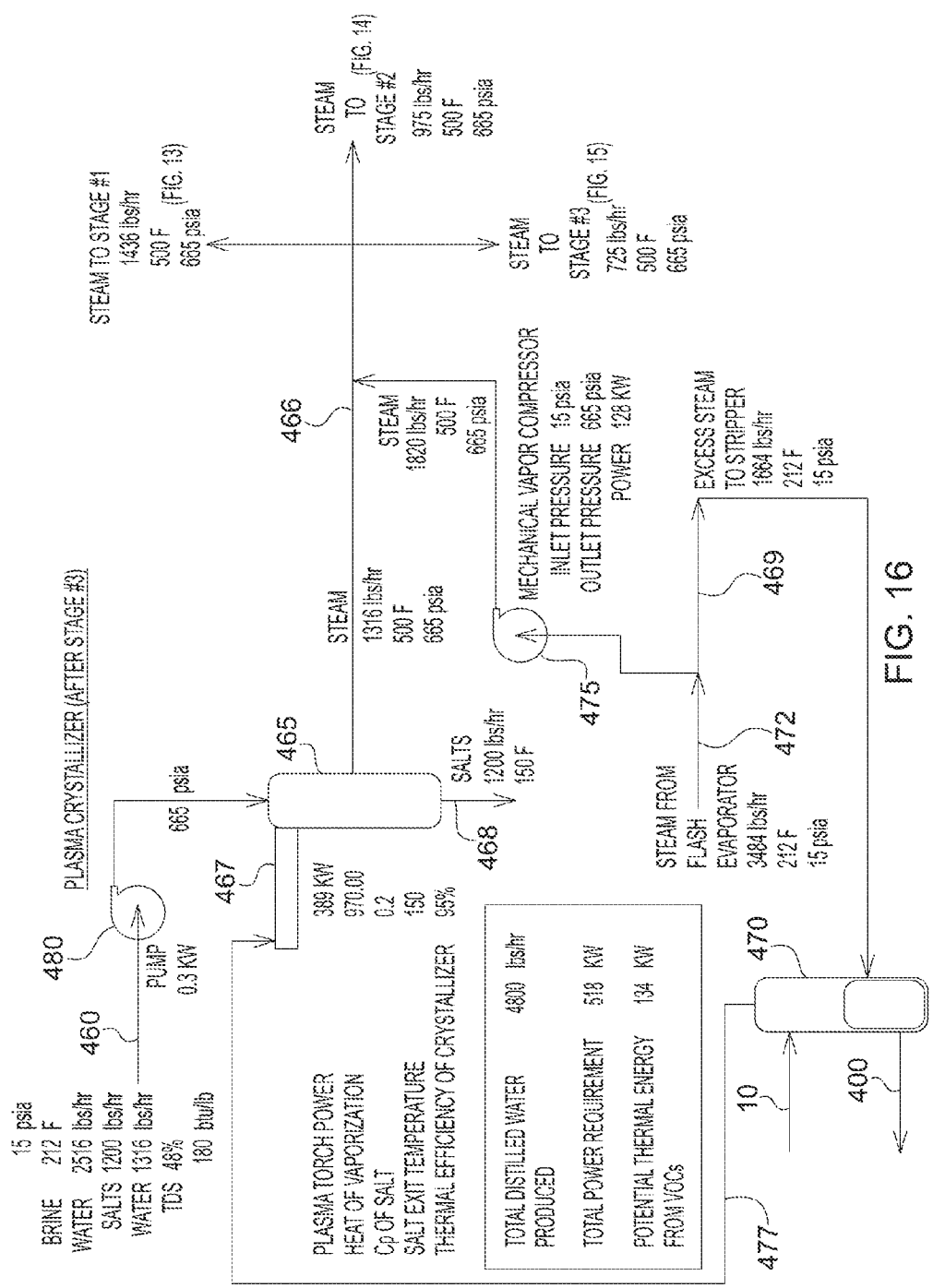
FIG. 16 is a schematic flow diagram of an exemplary thermal reactor configured for use in a water treatment system in conjunction with treatment stages and elements such as those shown in FIGS. 13-15 in accordance with still a further embodiment of the present invention.

The condenser 403 receives some saturated steam directly from the crystallizer 465 of FIG. 16 at line 466 which, with the preheater 402 elevating the waste water temperature from 60° F. to 254° F. before the condenser 403, provides waste water at 445° F. from the condenser 403 and, favorably, there no need for the presence or operation of the additional heater 404. In the exemplary system, the elevation in temperature is the effect of steam from the steam output 466 of the crystallizer subsystem 465 of FIG. 16. That steam continues to the condenser 403 and the preheater 402 until it exits the preheater 402 at line 407 as distilled water. Under certain operating conditions, the steam addition from the crystallizer 465 may be negative, i.e., steam is sent as excess to the crystallizer 465 for other uses (e.g., as a heat source for the stripper 470).

The Stage #1 output 420 has the volume of waste water reduced from the input 400 with the salts more concentrated to approximately 27% TDS, which is increased from the initial approximately 20% TDS in the exemplary waste water at the input 400.

Stages #2 and #3 in FIGS. 14 and 15, respectively, have essentially the same equipment as shown in FIG. 13 for Stage #1 but with some different operating parameters as shown in the legends of FIGS. 14-15. Each of Stages #2 and #3 may also omit, or not operate, a heater between the condenser and flash evaporator of that stage.

Referring to FIG. 14 (Stage #2), the brine water progresses from the input 400 to the output 440 successively through a pump 421, a preheater 422, a condenser 423, and a flash evaporator 425. One alternative is to have, in place of a single preheater 422, a series of preheaters or heat exchangers. The heating medium for the preheater 422 can be excess steam available from a crystallizer 465 (see FIG. 16) and/or hot water from the condenser 423.

In this example, the pump 421, preheater 422, and condenser 423 elevate the waste water pressure to 400 psia and the temperature to 445° F. at the inlet 426 to the flash evaporator 425 without use of any heater elements between the condenser 423 and flash evaporator 425. The pump 421 elevates the pressure from 15 psia to 400 psia. The preheater 422 elevates the temperature from 212° F. to 272° F., while the condenser 422 further elevates the temperature to 445° F. Additionally, the preheater 422 produces distilled water at outlet 427.

One aspect of Stage #2 of FIG. 14 is, as shown in the legend to the right of the flash evaporator 425, that it is operated so the flash pressure, i.e., the downstream or output pressure of the flash evaporator 425, is approximately 15 psia, contrasting with the input or upstream pressure of 400 psia. The effect of this change in the pressure is that a larger portion of the water component of the waste water is separated from the dissolved solids in the form of steam. The remaining waste water becomes more concentrated in dissolved solids and exits the flash evaporator at outlet 440.

The condenser 423 receives some saturated steam directly from the crystallizer 465 of FIG. 16 at line 466 which, with the preheater 422 elevating the waste water temperature from 212° F. to 272° F. before the condenser 423, provides waste water at 445° F. from the condenser 423 and, favorably, there no need for the presence or operation of the heater 424. In the exemplary system, the elevation in temperature is the effect of steam from the steam output 466 of the crystallizer subsystem 465 of FIG. 16. That steam continues to the condenser 423 and the preheater 422 until it exits the preheater 422 at line 427 as distilled water. Under certain operating conditions, the steam addition from the crystallizer 465 may be negative, i.e., steam is sent as excess to the crystallizer 465 for other uses (e.g., as a heat source for the stripper 470).

The Stage #2 output 440 has the volume of waste water reduced from the input 420 with the salts more concentrated to approximately 36% TDS, which is increased from the initial approximately 27% TDS in the exemplary waste water at the input 420.

Referring to FIG. 15 (Stage #3), the brine water progresses from the input 440 to the output 460 successively through a pump 441, a preheater 442, a condenser 443, and a flash evaporator 445. One alternative is to have, in place of a single preheater 442, a series of preheaters or heat exchangers. The heating medium for the preheater 442 can be excess steam available from a crystallizer 465 (see FIG. 16) and/or hot water from the condenser 443.

In this example, the pump 441, preheater 442, and condenser 443 elevate the waste water pressure to 400 psia and the temperature to 445° F. at the inlet 446 to the flash evaporator 445 without use of any heater elements between the condenser 443 and flash evaporator 445. The pump 441 elevates the pressure from 15 psia to 400 psia. The preheater 442 elevates the temperature from 212° F. to 273° F., while the condenser 442 further elevates the temperature to 445° F. Additionally, the preheater 442 produces distilled water at outlet 447.

One aspect of Stage #3 of FIG. 15 is, as shown in the legend to the right of the flash evaporator 445, that it is operated so the flash pressure, i.e., the downstream or output pressure of the flash evaporator 445, is approximately 15 psia, contrasting with the input or upstream pressure of 400. The effect of this change in the pressure is that a larger portion of the water component of the waste water is separated from the dissolved solids in the form of steam. The remaining waste water becomes more concentrated in dissolved solids and exits the flash evaporator at outlet 460.

The condenser 443 receives some saturated steam directly from the crystallizer 465 of FIG. 16 at line 466 which, with the preheater 442 elevating the waste water temperature from 212° F. to 273° F. before the condenser 443, provides waste water at 445° F. from the condenser 443 and, favorably, there no need for the presence or operation of the heater 444. In the exemplary system, the elevation in temperature is the effect of steam from the steam output 466 of the crystallizer subsystem 465 of FIG. 16. That steam continues to the condenser 443 and the preheater 442 until it exits the preheater 442 at line 447 as distilled water. Under certain operating conditions, the steam addition from the crystallizer 465 may be negative, i.e., steam is sent as excess to the crystallizer 465 for other uses (e.g., as a heat source for the stripper 470).

The Stage #3 output 340 has the volume of waste water reduced from the input 440 with the salts more concentrated to approximately 48% TDS, which is increased from the initial approximately 36% TDS in the exemplary waste water at the input 420.

The exemplary system includes multiple (three) concentration stages (FIGS. 13-15) that are substantially alike in the combination of equipment used. However, other exemplary systems with multiple concentration stages may have individual stages of more varied combinations of equipment without departing from the spirit and scope of the present invention.

The level of pressurization of waste water in all stages is such that there is no boiling (nucleate or other type) of the waste water inside and across the heat exchanger surfaces of the condensers and preheaters of each stage. This prevents the formation of deposits (scales, fouling, etc.) on the heat exchanger surfaces and reduces the requirement for cleaning of the heat exchangers. This results in the reduction of the operating cost.

FIG. 16 represents an example of applying the output brine water (line 460) of the Stage #3 treatment (FIG. 15) to a plasma crystallizer 465. The plasma crystallizer 465 is an example of a known pyrolytic reactor that can be used to finish separation of water from salts dissolved in it. One skilled in the relevant art will appreciate, however, that other thermal reactors may also be used without departing from the spirit and scope of the present invention. The example of a plasma reactor, which can be consistent with known plasma gasification/vitrification reactors, operated with one or more plasma torches 467, as is well-known in published literature, is believed to provide opportunity for a favorable cost-benefit ratio.

In general, for multistage operation, the plasma crystallizer 465 (or other reactor) is utilized at the final concentration stage when the output brine water has been concentrated to a desired level, as described in the above example. It can also be suitable to have a multistage system not only for salts concentration (as in FIGS. 13-15), but also a separation subsystem with a reactor after any individual one of the early concentration stages (e.g., after either, or both, of Stages #1 and #2). However, it is generally more cost effective to have a single separation subsystem after the last of a determined number of concentration stages for the desired separation.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 16, the crystallizer 465 has a salts output at an outlet 468 equivalent to the total salts content of the original wastewater. The water output of the total system is now recovered as clean distilled water from the preheaters 402, 422, 442 of the respective Stages of FIGS. 13-15, and/or may also be recovered directly from steam exiting the crystallizer 465.

FIG. 16 shows brine water 460 entering the crystallizer 465 via a pump 480 that raises the pressure to 665 psia. FIG. 16 also shows how steam from the crystallizer 465 can be redirected back to the respective earlier Stages of FIGS. 13-15. The steam output from the crystallizer 465 at line 466 may be provided back to the various Stages #1, #2 and #3 and used for heating by the respective preheaters and condensers therein. Also, FIG. 16 shows an "Excess Steam to Stripper" of a certain amount at line 469. This steam 469 is used in a stripper 470 which is utilized to remove volatile organic compounds ("VOCs") from the waste water before processing. Some excess steam from the crystallizer 465 may also be used for other purposes, e.g., to preheat the input waste water in a preheater or condenser.

Before treatment in the Stages shown in FIGS. 13-15, the incoming waste water 10 can be, for example, sent to the stripper 470 where the steam 469 is used to remove VOCs from the waste water 10. The excess steam 469 can be used directly in the stripper 470, as shown in FIG. 16, or used to heat air in a separate heat exchanger where the heated air is then used in the stripper to remove the VOCs. The stripped waste water is sent as feed to the input 400 to Stage #1 of FIG. 13. The VOCs which are removed from the waste water 10 exit the stripper through a conduit 477 which connects to the plasma crystallizer 465. Additionally or alternatively, a condenser with a knock-out pot (not shown) can be used between the plasma crystallizer 465 and the stripper 470 with the condensed VOCs (as well as any stripped VOCs) fed directly to the plasma crystallizer 465. The VOCs are fed in front of the plasma torch 467 (e.g., along with brine water 460 from Stage #3 from the pump 480) such that they intensely mix with the high temperature gases exiting from the plasma torch 467. The plasma torch 467 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 465, along with heat inputted through the plasma torch 467, to vaporize the water from the brine water 460. This reduces the amount of heat and the corresponding amount of electricity utilized in the plasma crystallizer 465, thus increasing its cost effectiveness.

The steam exiting the plasma crystallizer 465 can be periodically vented to the atmosphere (not shown) to keep the levels of non-condensable gases low enough such that they do not degrade the performance of the heat exchangers used in the inventive system and process.

FIG. 16 also shows some steam from the flash evaporators 405, 425, 445 of concentration Stages #1, #2 and #3 at an input 472 goes to a compressor 475 that elevates the steam to a pressure of 665 psia and a temperature of 500° F. to be recycled as part of the steam that goes back to the treatment Stages of FIGS. 13-15.

It is therefore seen that systems and processes in accordance with the still further embodiment of the present invention can make use of known and available components, such as, for example, flash evaporators for concentration of salts and plasma (or other) gasifier reactors for crystallization (or vitrification) of the salts, in particular innovative ways with insight as to both the capital cost and the operating cost. A need for such cost effective water treatment has been heightened by practices such as the use of large amounts of water in natural gas drilling However, the present invention may be used in any situation where impurities to be removed exist.

In general summary, but without limitation, the still further embodiment of the present invention can be characterized in the following ways, for example: A system, and a corresponding method, in which waste water is supplied to one or more stages of equipment including a pump for pressurizing the water (e.g., to about 400 psia), a preheater that heats the pressurized waste water well above normal boiling temperature, a condenser that effects further heating of the pressurized waste water, a flash evaporator, or other device, that receives the heated, pressurized waste water and results in fluid evaporation and concentration of solids that were in the waste water. In for example, instances in which the waste (brine) water with concentrated solids cannot be otherwise readily and safely disposed of, a thermal or pyrolytic reactor is provided to crystallize or otherwise yield a form of the solids that can be readily and safely disposed of. In one form, such a reactor may also be applied as a heater for the original incoming waste water. Also, or alternatively, such a reactor may be used to form a vitrified glass of the salts output of any water treatment system that produces a brine water.

Furthermore, the examples described herein show how use can be made of flash evaporators operated at a considerable difference of upstream pressure (e.g., 400 psia) and downstream pressure (e.g., 15 psia). To do so, the pyrolytic reactor of the inventive system is operated at a significantly higher pressure than is usual for such equipment (e.g., a plasma crystallizer operated at a pressure of 665 psia and steam developed in the reactor is supplied directly to the condensers of the earlier salts concentration Stages). All of which is believed to contribute significantly to reduced operating costs which can be very beneficial, even though initial capital costs may be increased.

Figure 17:
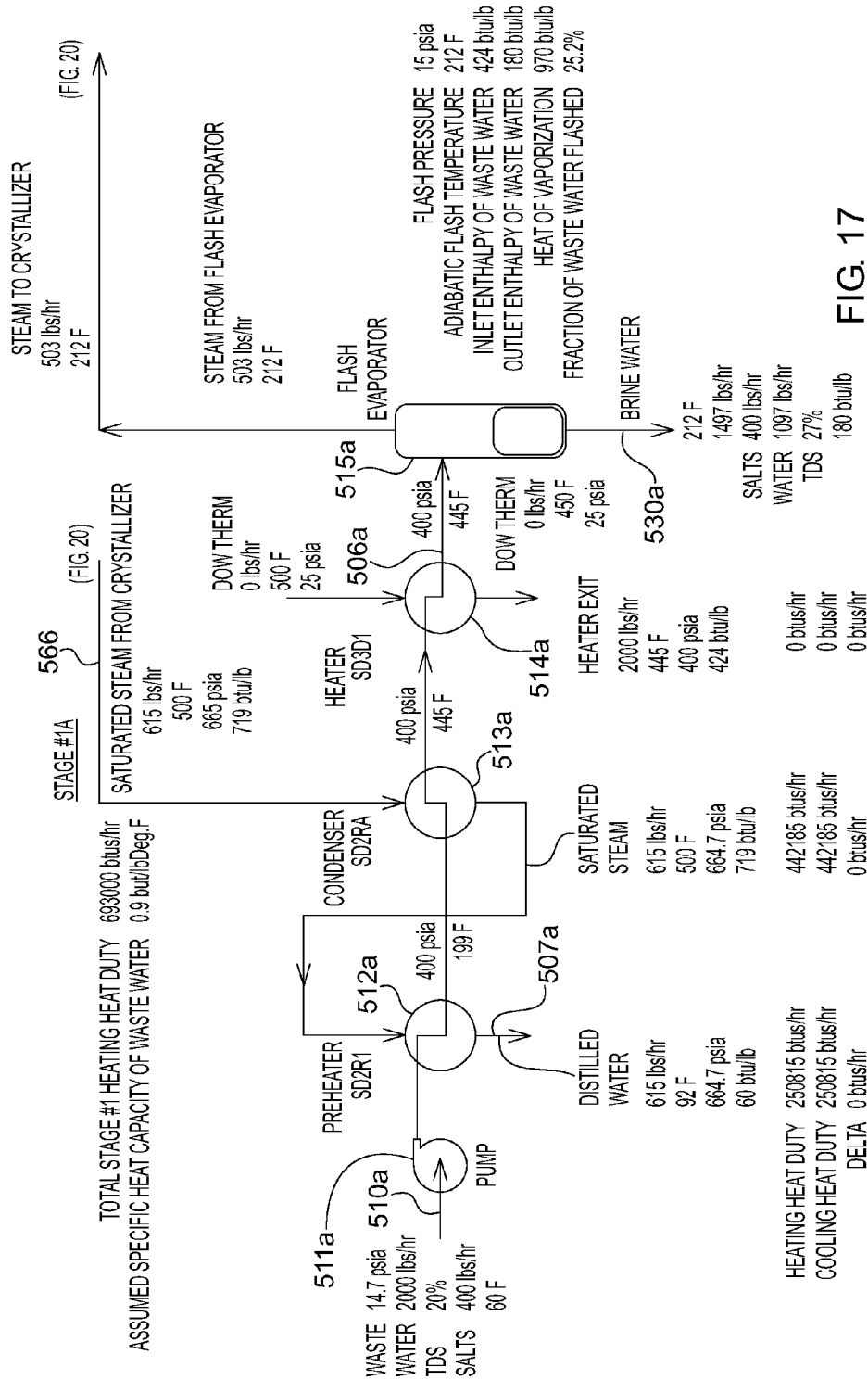
FIGS. 17, 18 and 19 are schematic flow diagrams of particular examples of stages of a treatment system in accordance with another embodiment of the present invention.
Figure 18:
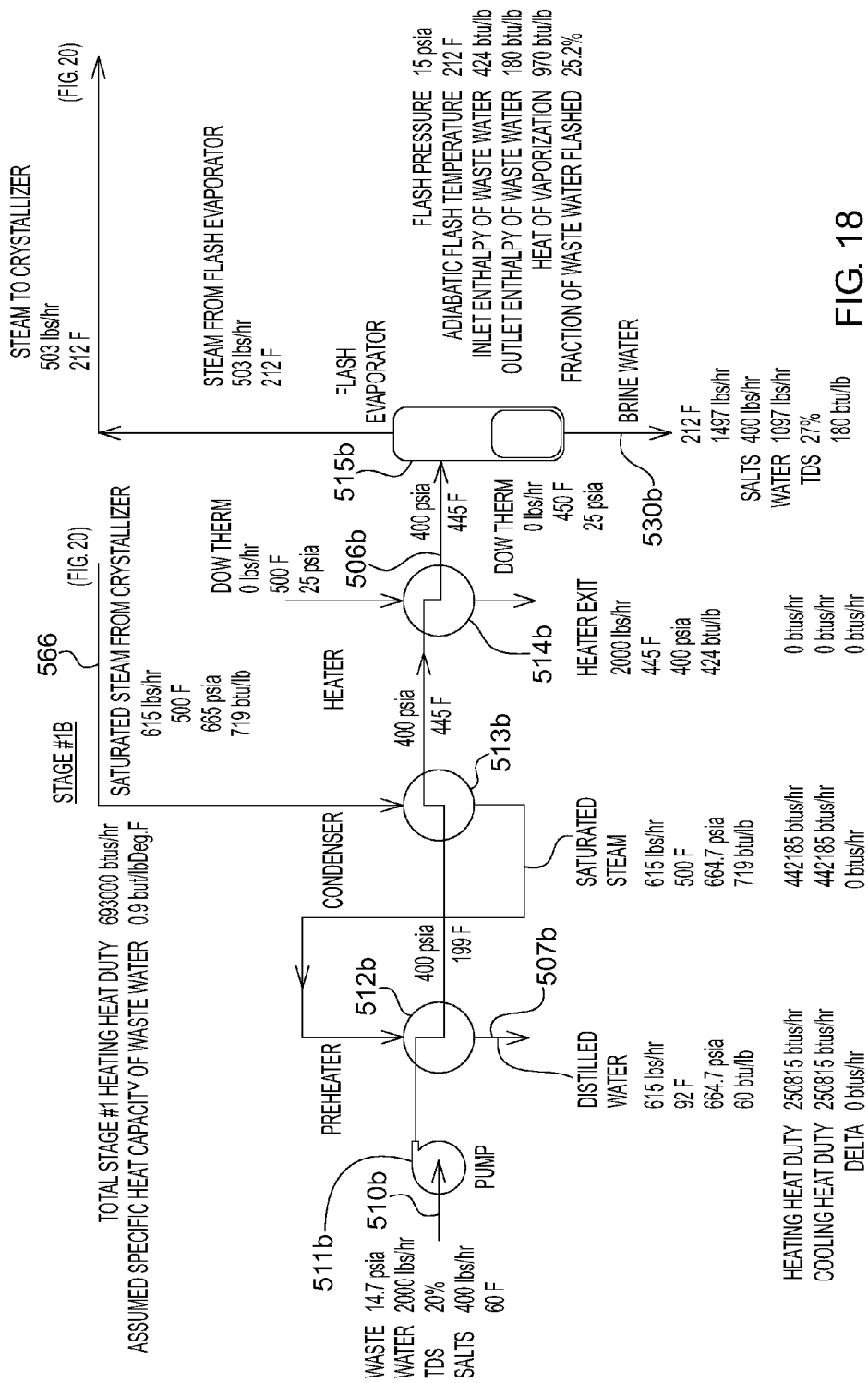
Figure 19:
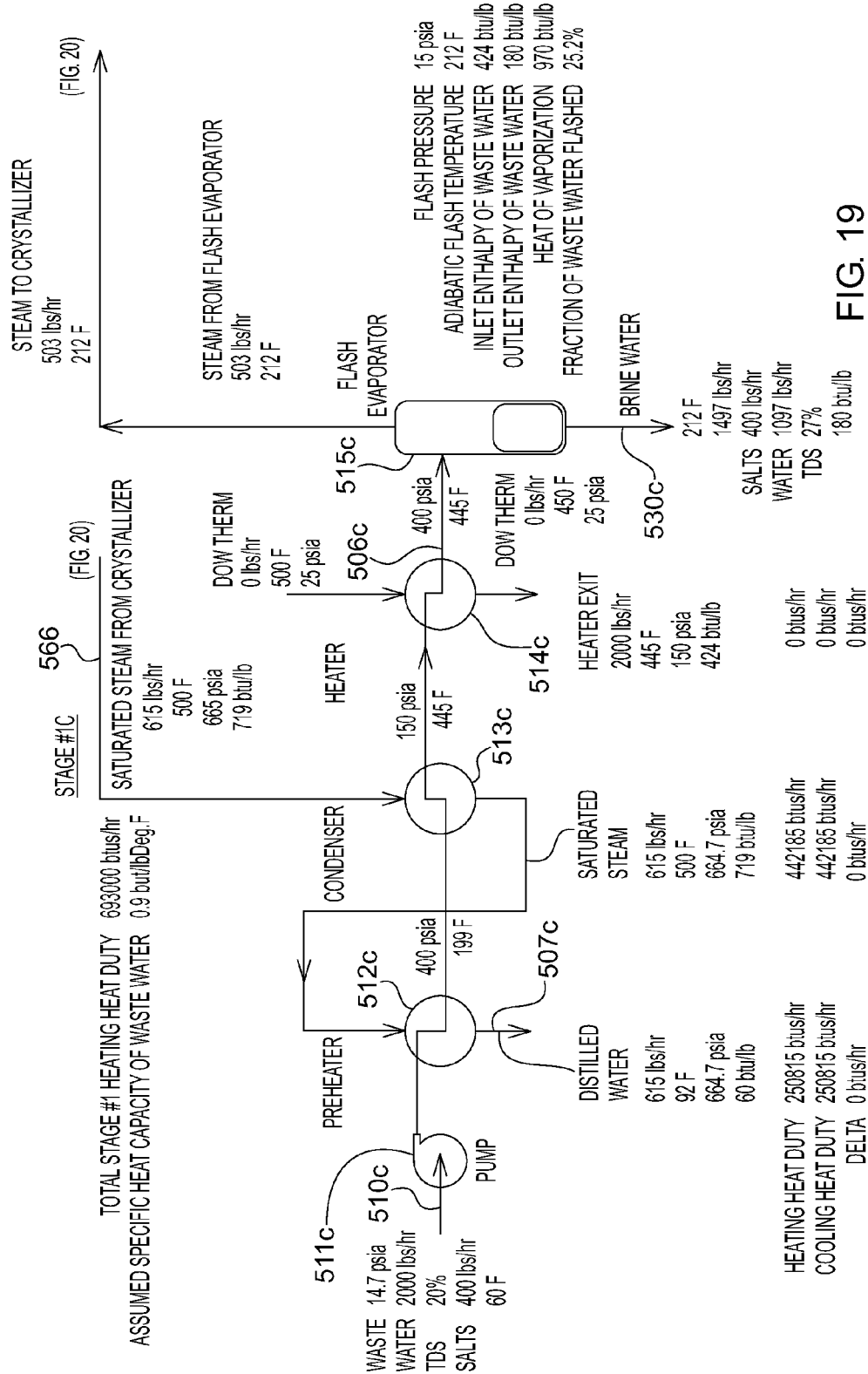

FIGS. 17-20 illustrate another embodiment of the present invention. FIGS. 17, 18 and 19 will be individually discussed, but first their general relation to each other in an exemplary multi-stage system (here with three stages) will be described.

Each of the FIGS. 17-20, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

A separate batch of wastewater 500 is supplied to each of the inlets 510a, 510b, and 510c of FIGS. 17-19, respectively. Each Stage heats and pressurizes the waste water that is then supplied to a single flash evaporator 515a, 515b and 515c, respectively. The flash evaporators 515a, 515b and 515c have brine water outputs, at an outlet 530a, 530b and 530c, respectively, that is combined into a single output 530 from wastewater to each of the inputs 510a, 510b and 510c.

Referring to FIGS. 17, 18 and 19, which represent Stages #1A, #1B and #1C, respectively, each batch of waste water progresses from the input 510a, 510b, 510c to the output 530a, 530b, 530c successively through a pump 511a, 511b, 511c, a preheater 512a, 512b, 512c, a condenser 513a, 513b, 513c, and a flash evaporator 515a, 515b, 515c. One alternative is to have, in place of a single preheater 512a, 512b, 512c, a series of preheaters or heat exchangers. The heating medium for the preheater 512a, 512b, 512c can be excess steam available from a crystallizer 565 (see FIG. 20) and/or hot water from the condenser 513a, 513b, 513c.

For convenience, when referring to the same element in the various Stages, the reference letters a-c will be omitted and only the reference number will be used. It is to be understood that the element referred to is the same element in all three Stages.

Referring to FIGS. 17-19, the pump 511, preheater 512, and condenser 513 elevate the waste water pressure to 400 psia and the temperature to 445° F. at the inlet 506 to the flash evaporator 515 without use of any heater elements between the condenser 513 and flash evaporator 515. The pump 511 elevates the pressure from 14.7 psia (1 atm) to 400 psia. The level of pressurization of waste water in all stages is such that there is no boiling of the waste water inside and across the heat exchanger surfaces of all heat exchangers used in this system. This is done to prevent the formation of deposits (scales, fouling, etc.) on the heat exchanger surfaces. The preheater 512 elevates the temperature from 60° F. to 199° F., while the condenser 513 further elevates the temperature to 445° F. Additionally, the preheater 512 produces distilled water at outlet 507.

For drawing convenience, each concentration Stage (FIGS. 17-19) shows a heater 514 (e.g., heater 514a in FIG. 17, heater 514b in FIG. 18, heater 514c in FIG. 19) between the condenser and flash evaporator, which may be omitted entirely or, if present, not supplied with any heating fluid. As shown in FIGS. 17-19, the heater 514 has zero input and zero output of heating fluid (e.g., DowTherm™). For system equipment economy, the heater 514 is preferably omitted. However, systems may be arranged as shown and provide the option to operate or to not operate such a heater 514. Further explanation of what enables avoiding use of a heater 514 is given below.

One aspect of Stages #1A, #1B and #1C of FIGS. 17, 18 and 19 is, as shown in the legend to the right of the flash evaporator 515, that it is operated so the flash pressure, i.e., the downstream or output pressure of the flash evaporator 515, is approximately 15 psia, contrasting with the input or upstream pressure of 400 psia. The effect of this change in the pressure is that a larger portion of the water component of the waste water is separated from the dissolved solids in the form of steam. The remaining waste water becomes more concentrated in dissolved solids and exits the flash evaporator at outlet 530.

Figure 20:
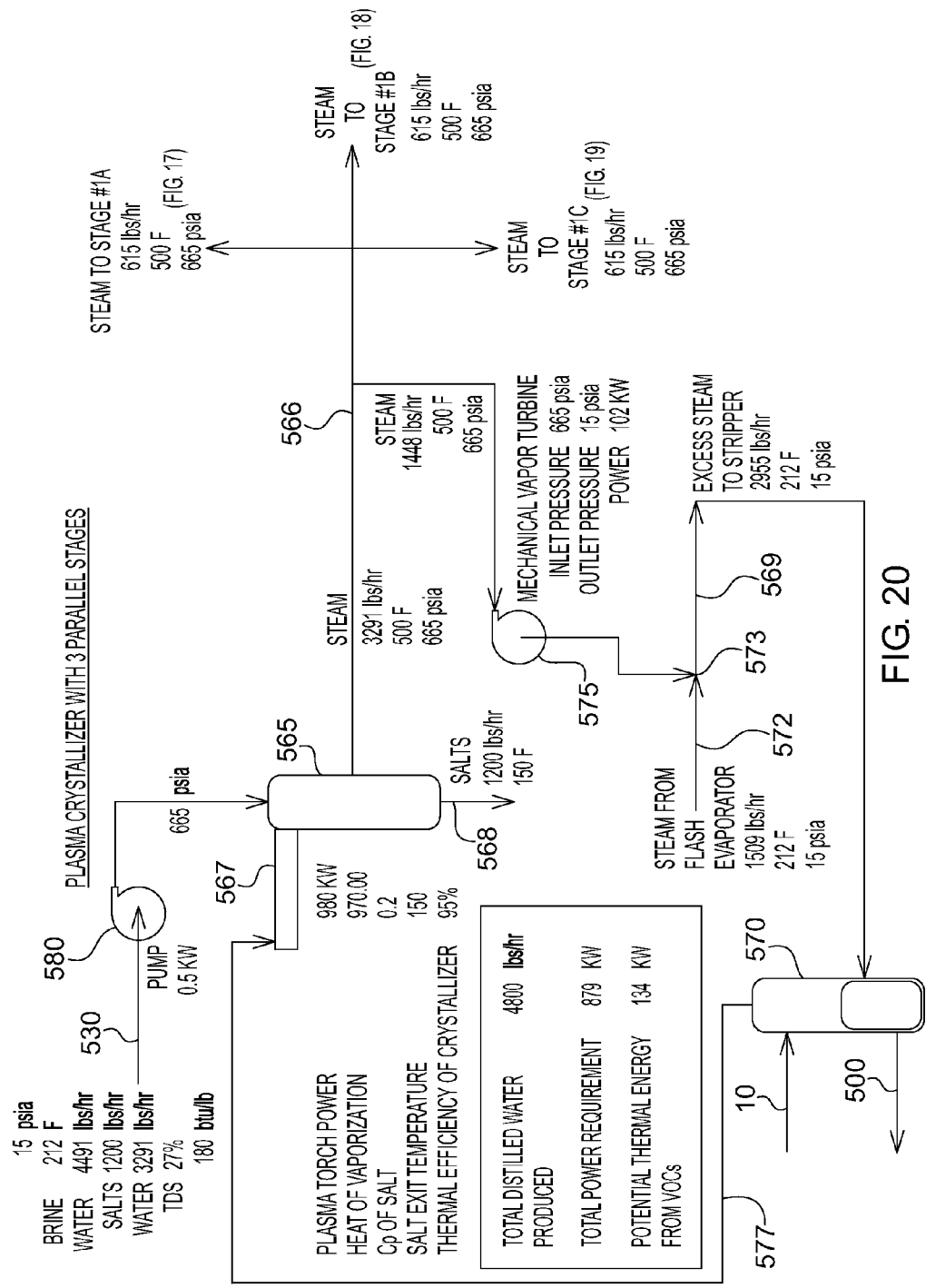
FIG. 20 is a schematic flow diagram of an exemplary thermal reactor configured for use in a water treatment system in conjunction with treatment stages and elements such as those shown in FIGS. 17-19 in accordance with another embodiment of the present invention.

The condenser 513 receives some saturated steam directly from the crystallizer 565 of FIG. 20 at line 566 which, with the preheater 512 elevating the waste water temperature from 60° F. to 199° F. before the condenser 513, provides waste water at 445° F. from the condenser 513 and, favorably, there no need for the presence or operation of the additional heater 514. In the exemplary system, the elevation in temperature is the effect of steam from the steam output 566 of the crystallizer subsystem 565 of FIG. 20. That steam continues to the condenser 513 and the preheater 512 until it exits the preheater 512 at line 507 as distilled water. Under certain operating conditions, the steam addition from the crystallizer 565 may be negative, i.e., steam is sent as excess to the crystallizer 565 for other uses (e.g., as a heat source for the stripper 570).

The output 530 of the various parallel Stages has the volume of waste water reduced from the input 510 with the salts more concentrated to a brine water to approximately 27% TDS, which is increased from the initial approximately 20% TDS in the exemplary waste water at the input 510.

In each of FIGS. 17-19, it is shown the individual stages outputs 530a, 530b, 530c of the system's single flash evaporator 515a, 515b, 515c, respectively, are equal. The combined inputs 510a, 510b, 510c to the treatment stages make up 6000 lbs/hr, including salts of 1200 lbs/hr. The brine water outputs 530a, 530b, 530c of the single flash evaporators 515a, 515b, 515c, respectively, include each stage's output which are combined (as shown in FIG. 20 as conduit 530), equals a total of 4491 lbs/hr, which includes the 1200 lbs/hr of salts in the three inputs 510a, 510b, 510c. The salts are now 27% of each Stage and of the total outputs in Total Dissolved Solids ("TDS"), compared to just 20% at the inputs.

The exemplary system includes multiple (three) concentration stages (FIGS. 17-19) that are substantially alike in the combination of equipment used. However, other exemplary systems with multiple concentration stages may have individual stages of more varied combinations of equipment without departing from the spirit and scope of the present invention.

The level of pressurization of waste water in all stages is such that there is no boiling (nucleate or other type) of the waste water inside and across the heat exchanger surfaces of the condensers and preheaters of each stage. This prevents the formation of deposits (scales, fouling, etc.) on the heat exchanger surfaces and reduces the requirement for cleaning of the heat exchangers. This results in the reduction of the operating cost.

FIG. 20 represents an example of applying the output brine water (line 530 with the combined individual outputs 530a, 530b, 530c) of the single flash evaporators 515a, 515b, 515c, respectively, of the concentration Stages #1A, #1B, #1C to a plasma crystallizer 565. The plasma crystallizer 565 is an example of a known pyrolytic reactor that can be used to finish separation of water from salts dissolved in it. One skilled in the relevant art will appreciate, however, that other thermal reactors may also be used without departing from the spirit and scope of the present invention. The example of a plasma reactor, which can be consistent with known plasma gasification/vitrification reactors, operated with one or more plasma torches 567, as is well-known in published literature, is believed to provide opportunity for a favorable cost-benefit ratio.

The exemplary arrangement shown in FIGS. 17-20 uses a single plasma crystallizer 565, as well as a multiple flash evaporators 515a, 515b, 515c, for any number of parallel waste water flows (which are of equal volume and content in the illustrated example, but can vary from each other). Alternatively the multiple flash evaporators 515a, 515b, 515c may be replaced by a single flash evaporator. The size and cost of equipment can, at least in some instances, be favorable for use of a combination of multiple pressurizing and heating elements and a single concentration element.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 20, the crystallizer 565 has a salts output at an outlet 568 equivalent to the total salts content of the original wastewater. The water output of the total system is now recovered as clean distilled water from the preheaters 512a, 512b, 512c of the respective parallel Stages of FIGS. 17-19, and/or may also be recovered directly from steam exiting the crystallizer 565.

FIG. 20 shows brine water 530 entering the crystallizer 565 via a pump 580 that raises the pressure to 665 psia. FIG. 20 also shows how steam from the crystallizer 565 can be redirected back to the respective earlier Stages of FIGS. 17-19. The steam output from the crystallizer 565 at line 566 may be provided back to the various Stages #1A, #1B, #1C and used for heating by the respective preheaters and condensers therein. Also, FIG. 20 shows an "Excess Steam to Stripper" of a certain amount at line 569. This steam 569 is used in a stripper 570 which is utilized to remove volatile organic compounds ("VOCs") from the waste water before processing. Some excess steam from the crystallizer 565 may also be used for other purposes, e.g., to preheat the input waste water in a preheater or condenser.

Before treatment in the Stages shown in FIGS. 17-19, the incoming waste water 10 can be, for example, sent to the stripper 570 where the steam 569 is used to remove VOCs from the waste water 10. FIG. 20 shows steam 569 developed from concentration Stages #1A, #1B, #1C at an input 572 joined at a junction 573 with exiting steam from the crystallizer 565 that has been reduced in pressure by expansion in a mechanical vapor turbine 575 to recover energy and reduce the total amount of energy used in the process. The excess steam 569 can be used directly in the stripper 570, as shown in FIG. 20, or used to heat air in a separate heat exchanger where the heated air is then used in the stripper to remove the VOCs. The stripped waste water 500 is sent as feed to the inputs 510a, 510b, 510c of Stages #1A, #1B, #1C, respectively, as shown in FIGS. 17-19. The VOCs which are removed from the waste water 10 exit the stripper through a conduit 577 which connects to the plasma crystallizer 565. Additionally or alternatively, a condenser with a knock-out pot (not shown) can be used between the plasma crystallizer 565 and the stripper 570 with the condensed VOCs (as well as any stripped VOCs) fed directly to the plasma crystallizer 565. The VOCs are fed in front of the plasma torch 567 (e.g., along with brine water 530 from the pump 580) such that they intensely mix with the high temperature gases exiting from the plasma torch 567. The plasma torch 567 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 565, along with heat inputted through the plasma torch 567, to vaporize the water from the brine water 560. This reduces the amount of heat and the corresponding amount of electricity utilized in the plasma crystallizer 465, thus increasing its cost effectiveness.

The steam exiting the plasma crystallizer 565 can be periodically vented to the atmosphere (not shown) to keep the levels of non-condensable gases low enough such that they do not degrade the performance of the heat exchangers used in the inventive system and process.

It is therefore seen that systems and processes in accordance with the another embodiment of the present invention can make use of known and available components, such as, for example, flash evaporators for concentration of salts and plasma (or other) gasifier reactors for crystallization (or vitrification) of the salts, in particular innovative ways with insight as to both the capital cost and the operating cost. A need for such cost effective water treatment has been heightened by practices such as the use of large amounts of water in natural gas drilling However, the present invention may be used in any situation where impurities to be removed exist.

In general summary, but without limitation, the another embodiment of the present invention can be characterized in the following ways, for example: A system, and a corresponding method, in which waste water is supplied to one or more stages of equipment including a pump for pressurizing the water (e.g., about 400 psia), a preheater that heats the pressurized waste water well above normal boiling temperature, a condenser that effects further heating of the pressurized waste water, a single, or plural, flash evaporator(s), or other concentration device(s), that receives the heated, pressurized water flows from multiple parallel stages of pressurizing and heating elements and results in fluid evaporation and concentration of solids that were in the waste water. In, for example, instances in which the waste (brine) water with concentrated solids cannot be otherwise readily and safely disposed of, a thermal or pyrolytic reactor is provided to crystallize or otherwise yield a form of the solids that can be readily and safely disposed of. In one form, such a reactor may also be applied as a heater for the original incoming wastewater. Also, or alternatively, such a reactor may be used to form a vitrified glass of the salts output of any water treatment system that produces a brine water.

The examples described herein show how use can be made of a single flash evaporator receiving multiple heated and pressurized flows of waste water with the concentrated output of the flash evaporator subjected to final separation of salts and water in a single reactor.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

I claim:

1. A system for treating waste water comprising:
a pump receiving waste water at a first pressure and a first temperature and pressurizing the received waste water to a second pressure between 120-180 psia, the second pressure greater than the first pressure, the waste water comprising dissolved solids and volatile organic compounds;
first and second preheaters connected in series and operatively connected to the pump such that the first preheater receiving the pressurized waste water from the pump and preheating the pressurized waste water to a second temperature, the second temperature greater than the first temperature, to produce a pressurized/preheated waste water, and the second preheater heating the pressurized/preheated waste water to a third temperature, the third temperature greater than the second temperature, to produce a pressurized/further preheated waste water, each of the first and second preheaters producing a distilled water without boiling of the waste water across heat transfer surfaces;
a condenser operatively connected to the first and second preheaters and receiving the pressurized/further preheated waste water and further heating the pressurized/preheated waste water to a fourth temperature between 286-430° F., the fourth temperature greater than third temperature, to produce a pressurized/heated waste water without boiling of the waste water across heat transfer surfaces;
a heater operatively connected to the condenser and receiving the pressurized/heated waste water and still further heating the pressurized/further heated waste water to a fifth temperature between 400-600° F., the fifth temperature greater than the fourth temperature, to produce a pressurized/further heated waste water without boiling of the waste water across heat transfer surfaces;
an evaporator, operated at a third pressure between 4-6 psia, the third pressure less than the second pressure, and at saturation temperature of a steam at the third pressure, operatively connected to the heater and removing dissolved solids from the pressurized/heated waste water by evaporation caused by depressurization of the waste water to produce a saturated steam and a brine water, wherein the brine water has a total dissolved solids content greater than a total dissolved solids content of the received waste water; and
a crystallizer crystallizing the brine water to produce a solid mass of waste product and a high pressure steam, wherein the crystallizer includes a plasma torch to crystallize the brine water,
wherein a portion of the saturated steam from the evaporator is superheated to a sixth temperature greater than the fifth temperature and is used as a heat source by at least one of the heater, condenser and second preheater without boiling of the waste water across heat transfer surfaces,
wherein another portion of the saturated steam from the evaporator is superheated to a seventh temperature greater than the second temperature but lower than the third temperature and is used as a heat source by the first preheater without boiling of the waste water across heat transfer surfaces.

2. The system of claim 1, wherein the pump, first and second preheaters, condenser, heater and evaporator comprise a stage, and wherein the system comprises multiple stages connected in series with the brine water output by one stage used as the received waste water of a next stage.

3. The system of claim 2, wherein the brine water output by each stage has a total dissolved solids content that is higher than that of a previous stage.

4. The system of claim 1, wherein the high pressure steam from the crystallizer is mixed with the saturated steam from the evaporator and superheated to the fifth temperature, wherein the mixed and superheated steam is used as a heat source by at least one of the heater, condenser and second preheater without boiling of the waste water across heat transfer surfaces.

5. The system of claim 1, further comprising a stripper initially receiving the waste water and removing volatile organic compounds from the waste water prior to the waste water being pressurized by the pump, wherein the removed volatile organic compounds are used as a fuel by the plasma torch to crystallize the brine water.

6. The system of claim 5, where the saturated steam produced by the evaporator is used as a heat source by the stripper.

7. The system of claim 1, wherein the pump, first and second preheaters, condenser, heater and evaporator comprise a stage, and wherein the system comprises multiple stages operating in parallel with each receiving a portion of the waste water.

8. The system of claim 7, wherein the brine water output by each stage has a total dissolved solids content that is higher than that of the received waste water.

9. The system of claim 7, wherein the brine water from each stage is combined and supplied to the crystallizer which crystallizes the brine water to produce the solid mass of waste product and the high pressure steam.

10. The system of claim 1, wherein the pump, first and second preheaters, condenser, heater and evaporator comprise a stage, wherein the system comprises multiple stages with the brine water output by one stage used as the received waste water of a next stage, and wherein the received waste water at stages subsequent to a first stage is at a third pressure less than the first pressure.

11. The system of claim 1, wherein the solid mass of waste product comprises a vitrified glass of salts in the brine water.

12. A system for treating waste water comprising:
a pump receiving waste water at a first pressure between 11.8-17.6 psia and a first temperature between 48-72° F. and pressurizing the received waste water to a second pressure between 120-180 or 320-480 psia, the waste water comprising dissolved solids and volatile organic compounds;
a preheater operatively connected to the pump and receiving the pressurized waste water from the pump and preheating the pressurized waste water to a second temperature greater than the first temprature to produce a pressurized/preheated waste water, and a distilled water without boiling of the waste water across heat transfer surfaces;
a condenser operatively connected to the preheater and receiving the pressurized/preheated waste water and further heating the pressurized/preheated waste water to a third temperature between 288-534° F., the third temperature greater than second temperature, to produce a pressurized/heated waste water without boiling of the waste water across heat transfer surfaces;
a heater operatively connected to the condenser and receiving the pressurized/heated waste water and still further heating the pressurized/heated waste water to a fourth temperature between 298-600° F., the fourth temperature greater than the third temperature, to produce a pressurized/further heated waste water without boiling of the waste water across heat transfer surfaces;
an evaporator, operated at a third pressure between 4-6 or 12-18 or 20-30 psia, the third pressure less than the second pressure, and at saturation temperature of a steam at the third pressure, operatively connected to the heater and removing dissolved solids from the pressurized/further heated waste water by evaporation caused by depressurization of the waste water to produce a saturated steam and a brine water, wherein the brine water has a total dissolved solids content greater than a total dissolved solids content of the received waste water; and
a crystallizer crystallizing the brine water to produce a solid mass of waste product and a high pressure steam, wherein the crystallizer includes a plasma torch to crystallize the brine water,
wherein a portion of the saturated steam from the evaporator is superheated to a fifth temperature greater than the fourth temperature and is used as a heat source by at least one of the heater, condenser and preheater without boiling of the waste water across heat transfer surfaces.

13. The system of claim 12, wherein the pump, preheater, condenser, heater and evaporator comprise a stage, and wherein the system comprises multiple stages connected in series with the brine water output by one stage used as the received waste water of a next stage.

14. The system of claim 13, wherein the brine water output by each stage has a total dissolved solids content that is higher than that of a previous stage.

15. The system of claim 12, wherein the high pressure steam from the crystallizer is mixed with the saturated steam from the evaporator and superheated to the fifth temperature, wherein the mixed and superheated steam is used as a heat source by at least one of the heater, condenser and preheater without boiling of the waste water across heat transfer surfaces.

16. The system of claim 12, further comprising a stripper initially receiving the waste water and removing volatile organic compounds from the waste water prior to the waste water being pressurized by the pump, wherein the removed volatile organic compounds are used as a fuel by the plasma torch to crystallize the brine water.

17. The system of claim 16, where the saturated steam produced by the evaporator is used as a heat source by the stripper.

18. The system of claim 12, wherein the pump, preheater, condenser, heater and evaporator comprise a stage, and wherein the system comprises multiple stages operating in parallel with each receiving a portion of the waste water.

19. The system of claim 18, wherein the brine water output by each stage has a total dissolved solids content that is higher than that of the received waste water.

20. The system of claim 18, wherein the brine water from each stage is combined and supplied to the crystallizer which crystallizes the brine water to produce a solid mass of waste product and the high pressure steam.

21. The system of claim 12, wherein the pump, preheater, condenser, heater and evaporator comprise a stage, wherein the system comprises multiple stages with the brine water output by one stage used as the received waste water of a next stage, and wherein the received waste water at stages subsequent to a first stage is at a third pressure less than the first pressure.

22. The system of claim 12, wherein the solid mass of waste product comprises a vitrified glass of salts in the brine water.

23. A method of treating waste water comprising the steps of:
(a) receiving waste water at a first pressure and a first temperature, the waste water comprising dissolved solids and volatile organic compounds;
(b) pressurizing the received waste water to a second pressure between 120-180 psia, the second pressure greater than the first pressure;
(c) preheating the pressurized waste water from the pump to a second temperature, the second temperature greater than the first temperature, to produce a pressurized/preheated waste water by using a first preheater;
(d) still further preheating the pressurized/preheated waste water to a third temperature, the third temperature greater than the second temperature, to produce a pressurized/further preheated waste water by using a second preheater;
(e) producing distilled water in each of the first and second preheaters without boiling of the waste water across heat transfer surfaces;
(f) heating the pressurized/further preheated waste water to a fourth temperature between 286-430° F., the fourth temperature greater than third temperature, wherein the heating step is performed by a condenser receiving the pressurized/preheated waste water to produce a pressurized/heated waste water without boiling of the waste water across heat transfer surfaces;

(g) further heating the pressurized/heated waste water to a fifth temperature between 400-600° F., the fifth temperature greater than the fourth temperature, wherein the further heating step is performed by a heater receiving the pressurized/heated waste water to produce pressurized/further heated waste water without boiling of the waste water across heat transfer surfaces;

(h) evaporating the pressurized/further heated to remove dissolved solids by an evaporator, operated at a third pressure between 4-6 psia, the third pressure less than the second pressure, and at saturation temperature of a steam at the third pressure, to result in evaporation caused by depressurization of the waste water to produce a saturated steam and a brine water, wherein the brine water has a total dissolved solids content greater than a total dissolved solids content of the received waste water; and (i) crystallizing, using a crystallizer, the brine water to produce a solid mass of waste product and a high pressure steam, wherein the crystallizer uses a plasma torch to crystallizer the brine water, wherein a portion of the saturated steam from the evaporator is superheated to a sixth temperature greater than the fifth temperature and is used as a heat source by at least one of the heater, condenser and second preheater without boiling of the waste water across heat transfer surfaces, and wherein another portion of the saturated steam from the evaporator is superheated to a seventh temperature greater than the second temperature but lower than the third temperature and is used as a heat source by the first preheater without boiling of the waste water across heat transfer surfaces.

24. The method of claim 23, wherein the steps (a)-(h) comprise a stage, and wherein the system comprises multiple stages connected in series with the brine water output by one stage used as the received waste water of a next stage.

25. The method of claim 24, wherein the brine water output in step (h) of each stage has a total dissolved solids content that is higher than that of a previous stage.

26. The method of claim 23, wherein the high pressure steam produced by step (i) is mixed with the saturated steam produced in step (h) and superheated to the fifth temperature, wherein the mixed and superheated steam is used as a heat source in at least one of the steps (g) by the heater, step (f) by the condenser and step (d) by the second preheater without boiling of the waste water across heat transfer surfaces.

27. The method of claim 23, further comprising step (j) removing the volatile organic compounds from the waste water prior to the waste water being pressurized by the pump by using a stripper, wherein the removed volatile organic compounds are used as a fuel by the plasma torch to crystallize the brine water.

28. The method of claim 27, where the saturated steam produced by the evaporator is used in step (j) as a heat source by the stripper.

29. The method of claim 23, wherein the steps (a)-(h) comprise a stage, and wherein the method comprises multiple stages operating in parallel with each receiving a portion of the waste water.

30. The method of claim 29, wherein the brine water output by each stage has a total dissolved solids content that is higher than that of the received waste water.

31. The method of claim 29, wherein the brine water from each stage is combined and supplied in the step (i) to the crystallizer which crystallizes the brine water to produce the solid mass of waste product and the high pressure steam.

32. The method of claim 23, wherein the steps (a)-(h) comprise a stage, wherein the method comprises multiple stage connected in series s with the brine water output by one stage used as the received waste water of a next stage, and wherein the received waste water at stages subsequent to a first stage is at a third pressure less than the first pressure.

33. The method of claim 23, wherein the solid mass of waste product comprises a vitrified glass of salts in the brine water.

34. A method of treating waste water comprising the steps of:

(a) receiving waste water at a first pressure between 11.8-17.6 psia and a first temperature between 48-72° F., the waste water comprising dissolved solids and volatile organic compounds;

(b) pressurizing the received waste water to a second pressure between 120-180 or 320-480 psia;

(c) preheating the pressurized waste water from the pump to a second temperature greater than the first temperature to produce a pressurized/preheated waste water by using a preheater;

(d) producing distilled water in the preheater without boiling of the waste water across heat transfer surfaces;

(e) heating the pressurized/preheated waste water to a third temperature between 288-534° F., the third temperature greater than second temperature, wherein the heating step is performed by a condenser receiving the pressurized/preheated waste water to produce a pressurized/heated waste water without boiling of the waste water across heat transfer surfaces;

(f) further heating the pressurized/further heated waste water to a fourth temperature between 298-600° F., the fourth temperature greater than the third temperature, wherein the further heating step is performed by a heater receiving the pressurized/heated waste water to produce a pressurized/further heated waste water without boiling of the waste water across heat transfer surfaces;

(g) evaporating the pressurized/further heated to remove dissolved solids by an evaporator, operated at a third pressure between 4-6 or 12-18 or 20-30 psia, the third pressure less than the second pressure, and at saturation temperature of a steam at the third pressure, to result in evaporation caused by depressurization of the waste water to produce a saturated steam and a brine water, wherein the brine water has a total dissolved solids content greater than a total dissolved solids content of the received waste water; and (h) crystallizing, using a crystallizer, the brine water to produce a solid mass of waste product and a high pressure steam, wherein the crystallizer uses a plasma torch to crystallize the brine water, wherein a portion of the saturated steam from the evaporator is superheated to a fifth temperature greater than the fourth temperature and is used as a heat source in at least one of the steps (f) by the heater, in step (e) by the condenser and step (c) by the preheater without boiling of the waste water across heat transfer surfaces, and wherein another portion of the saturated steam from the evaporator is superheated to a sixth temperature greater than the second temperature but lower than the third temperature and is used as a heat source in step (c) by the preheater without boiling of the waste water across heat transfer surfaces.

35. The method of claim 34, wherein the steps (a)-(g) comprise a stage, and wherein the system comprises multiple stages connected in series with the brine water output of step (g) of one stage used as the received waste water of step (a) of a next stage.

36. The method of claim 35, wherein the brine water output in step (g) of each stage has a total dissolved solids content that is higher than that of a previous stage.

37. The method of claim 34, wherein the high pressure steam produced by step (h) is mixed with the saturated steam produced in step (g) and superheated to the fourth temperature, wherein the mixed and superheated steam is used as a heat source in at least one of the step (f) by the heater, step (e) by the condenser and step (c) by the preheater without boiling of the waste water across heat transfer surfaces.

38. The method of claim 34, further comprising step (i) removing the volatile organic compounds from the waste water prior to the waste water being pressurized by the pump by using a stripper, wherein the removed volatile organic compounds are used as a fuel by the plasma torch to crystallize the brine water.

39. The method of claim 38, where the saturated steam produced by the evaporator is used in step (i) as a heat source by the stripper.

40. The method of claim 34, wherein the steps (a)-(h) comprise a stage, and wherein the method comprises multiple stages operating in parallel with each receiving a portion of the waste water.

41. The method of claim 40, wherein the brine water output by each stage has a total dissolved solids content that is higher than that of the received waste water.

42. The method of claim 40, wherein the brine water from each stage is combined and supplied in the step (h) to the crystallizer which crystallizes the brine water to produce the solid mass of waste product and the high pressure steam.

43. The method of claim 34, wherein the steps (a)-(g) comprise a stage, wherein the method comprises multiple stages connected in series with the brine water output by one stage used as the received waste water of a next stage, and wherein the received waste water at stages subsequent to a first stage is at a third pressure less than the first pressure.

44. The method of claim 34, wherein the solid mass of waste product comprises a vitrified glass of salts in the brine water.

* * * * *

UNITED STATES PATENT AND TRADEMARK OFFICE
CERTIFICATE OF CORRECTION

PATENT NO. : 9,440,163 B2  
APPLICATION NO. : 13/613388  
DATED : September 13, 2016  
INVENTOR(S) : Dighe It is certified that error appears in the above-identified patent and that said Letters Patent is hereby corrected as shown below:

In the Claims

Column 39, Line 24, Claim 23 change "crystallizer" to --crystallize--;

Column 40, Line 7, Claim 32 change "stage" to --stages--;

Line 44, Claim 34 after "heated" insert --waste water--.

Signed and Sealed this  
Twenty-eighth Day of March, 2017

Michelle K. Lee  
*Director of the United States Patent and Trademark Office*